United States Patent
Sita et al.

(10) Patent No.: US 6,301,299 B1
(45) Date of Patent: Oct. 9, 2001

(54) MEMORY CONTROLLER FOR AN ATSC VIDEO DECODER

(75) Inventors: Richard Sita, Audubon; Shuji Inoue, Burlington, both of NJ (US); Edward Brosz, King of Prussia, PA (US); Jereld Pearson, Somerdale, NJ (US); Michael Iaquinto, Horsham, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/087,225

(22) Filed: May 28, 1998

Related U.S. Application Data

(63) Continuation-in-part of application No. 08/706,189, filed on Aug. 30, 1996, which is a continuation-in-part of application No. 08/330,579, filed on Oct. 28, 1994, now Pat. No. 5,623,311.

(51) Int. Cl.[7] .................................................. H04N 07/18
(52) U.S. Cl. ...................... 375/240.01; 348/715; 348/714
(58) Field of Search .................................... 348/714, 715, 348/716, 717, 718, 719, 720; 375/240.01, 240.14, 240.15, 240.12

(56) References Cited

U.S. PATENT DOCUMENTS

| | | | |
|---|---|---|---|
| 5,583,572 | * 12/1996 | Sumihiro | 348/396 |
| 5,594,813 | * 1/1997 | Fandrianto et al. | 382/236 |
| 5,596,376 | 1/1997 | Howe . | |
| 5,654,773 | * 8/1997 | Kajimoto et al. | 348/717 |
| 5,659,715 | 8/1997 | Wu et al. . | |
| 5,717,461 | * 2/1998 | Hoogenboom | 348/716 |

FOREIGN PATENT DOCUMENTS

0828238A2   3/1998   (EP) .
0908827A2   4/1999   (EP) .

* cited by examiner

Primary Examiner—Andy Rao
(74) Attorney, Agent, or Firm—Ratner & Prestia

(57) ABSTRACT

A video memory system for storing ATSC video image data is configured as three channels, each channel having two banks and each bank including a plurality of memory rows. The exemplary memory system includes a buffer area for holding bit-stream data and six field buffer areas. The field buffer areas are arranged in pairs to form a three frame buffer areas, such that the buffer areas for the two fields in a given frame are allocated in respectively different banks. The video memory system includes an output memory controller which receives macroblocks of decoded image data and divides the received macroblocks into respective upper and lower half-macroblocks, the upper half-macroblock being stored in one field buffer of the frame and the lower half-macroblock being stored in the other field buffer of the frame. In addition, the output memory controller stores the luminance and chrominance components of the half-macroblocks in respectively different channels of the memory device and the channel assignment is changed from one half-macroblock to the next. The memory system also includes an input memory controller which retrieves reference half-macroblocks from the memory. The input memory controller is coupled to first and second address generators which operate concurrently to address image data in respectively different channels, banks and memory rows so that, when a reference half-macroblock which includes components from two or more stored half-macroblocks is retrieved, the memory read operations are overlapped.

10 Claims, 34 Drawing Sheets

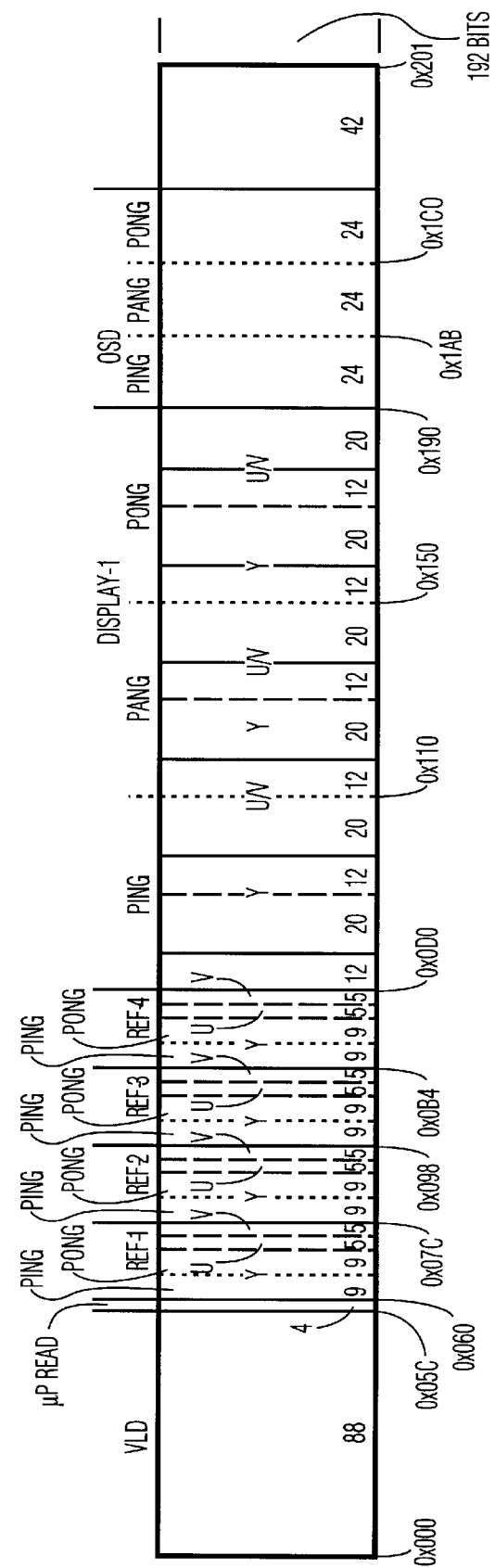

| | CHANNEL A | CHANNEL B | CHANNEL C | CHANNEL A ←1810 | CHANNEL B | CHANNEL C |
|---|---|---|---|---|---|---|
| HALF MACROBLOCK ROW Q | $Y_{HMBHB}$ | $Y_{HMBJA}$ | $Y_{HMBJB}$ | $Y_{HMBKA}$ | $Y_{HMBKB}$ | $Y_{HMBLA}$ |
| BANK A | | 4 | | | | BANK B |
| BANK B | | 5 | | | ←1811 | BANK A |
| HALF MACROBLOCK ROW R | | 4 | 8 | 5 | | |
| | $Y_{HMBHB}$ | $Y_{HMBJA}$ | $Y_{HMBJB}$ | $Y_{HMBKA}$ | $Y_{HMBKB}$ | $Y_{HMBLA}$ |
| | CHANNEL A | CHANNEL B 1812 | CHANNEL C | CHANNEL A | CHANNEL B | CHANNEL C |

FIG. 18A

| | CHANNEL B | CHANNEL A | CHANNEL C | CHANNEL B | CHANNEL A |
|---|---|---|---|---|---|
| 1814 | $UV_{HMBJA}$ | $UV_{HMBJ}$ | $UV_{HMBK}$ | $UV_{HMBK}$ | $UV_{HMBL}$ |
| HALF MACROBLOCK ROW Q BANK A | → 4 | | | | BANK B |
| BANK B | 8 | 8 | 3 | ←1815 | BANK A |
| HALF MACROBLOCK ROW R | $UV_{HMBJA}$ | $UV_{HMBJ}$ | $UV_{HMBK}$ | $UV_{HMBKX}$ | $UV_{HMBL}$ |
| | CHANNEL B | CHANNEL A 1810 | CHANNEL C | CHANNEL B | CHANNEL A |

MEMORY CONTROLLER FOR AN ATSC VIDEO DECODER

This application is a continuation-in-part of U.S. patent application Ser. No. 08/706,189 for IMAGE MEMORY STORAGE SYSTEM AND METHOD FOR A BLOCK ORIENTED IMAGE PROCESSING SYSTEM filed Aug. 30, 1996 which is a continuation in part of U.S. patent application Ser. No. 08/330,579 for MPEG VIDEO DECODER HAVING A HIGH BANDWIDTH MEMORY filed on Oct. 28, 1994 now U.S. Pat. No. 5,623,311.

FIELD OF THE INVENTION

The present invention relates to video memory storage systems and in particular to a memory controller for a data memory that is configured to hold a block-oriented image.

BACKGROUND OF THE INVENTION

Systems which process image data for display come in many forms. These include video games which construct images from preexisting data, medical diagnostic systems which faithfully reproduce medical imaging data, and video decompression systems which decode encoded video information and process it to produce successive images for display. Each of these systems has a common component: a memory in which data representing image information is stored prior to display. Many image processing systems store more than one image, an input image and an output image. The input image may be processed, for example, to add visual features corresponding to a player of a video game, to electronically enhance components of a medical image, or for use in decoding a later occurring motion compensated encoded image.

Many image processing systems use block-oriented algorithms. These algorithms allow an image to be decomposed into smaller pieces (i.e. blocks) and the blocks to be processed individually. Significant time savings can be achieved by processing the pixels in an image block in parallel. Because they are processed in parallel, however, entire blocks of pixels may be available for storage and processing in a relatively short time interval.

Thus, memory systems used in block-oriented image processing apparatus should be able to fetch and store entire blocks of data quickly. This process may be complicated where block boundaries are not fixed. For example, when processing a motion compensated image the decoded data may represent differences between pixels in a block at one time and pixels in a block at a previous time. In this instance, pixels of the prior block are held in memory and fetched in order to complete the decoding process of the newly available pixels. Often, in order to obtain the best matching block of pixels, the prior block is taken from a different position in the image than that occupied by the newly received block. The boundaries of this reference block may be shifted with respect to the other blocks stored in the memory. Thus, the reference block may contain pixels from portions of several blocks in the stored image.

Other types of image processing such as interpolation may also use pixels from adjacent blocks to form a single block of the output image. One form of image interpolation which is commonly used for decoding a high definition video signal, is to define a reference block which is displaced by one-half pixel from a block that is stored in the image memory. A set of pixels which is larger than one block is accessed to regenerate the reference block having a resolution of one-half pixel position. Thus, the image memory should not be limited to accessing single blocks of pixels.

Another image processing problem which impacts on the structure and organization of an image memory is multi-component image data. For example, compressed video images may include separate luminance and chrominance components because chrominance information may be compressed to a greater degree than the luminance information without perceptively degrading the image. When an image is decoded and displayed, the luminance and chrominance components are processed together and displayed together. During image processing, however, it may be desirable to process the luminance components separately from the chrominance components. This puts added constraints on the image memory system, because luminance and chrominance components from separate blocks may need to be accessed together in some processing steps and separately in other processing steps.

An example of an image processing system which uses many of these techniques is an MPEG-2 decoder which decodes image data in 4:2:0 macroblock format. FIG. 1A is a graphical depiction of such an image which shows how the image is divided into slices. In FIG. 1A, each of the blocks labeled A through G is a separate slice of an image. Each slice is composed of many macroblocks. An exemplary macroblock is shown in FIG. 1B. This macroblock is in 4:2:0 format and so it has four eight-pixel by eight-pixel luminance blocks and two eight-pixel by eight-pixel chrominance blocks, one for the Cb color difference signal and the other for the Cr color difference signal.

When the image is received and decoded, the blocks occur in the sequence shown in FIG. 1C, that is to say, four luminance blocks, one Cb color difference block and one Cr color difference block. Image data is fetched from memory for display in the same order. In the display processor, each of the Cb and Cr blocks is expanded to four blocks and combined with respective ones of the four luminance blocks to regenerate a color image.

During image processing, however, the luminance and chrominance data may be accessed in blocks that do not conform to block boundaries. This is illustrated in FIGS. 1D and 1E. In FIG. 1D a reference block 110 is formed from parts of four other blocks 112, 114, 116 and 118. Thus, the boundaries of this reference block do not correspond to the boundaries of the image blocks that were stored in the memory when the image was decoded. Consequently, if the memory is arranged to access image blocks having fixed addresses, up to four image blocks may need to be accessed in order to regenerate the block 110.

FIG. 1E illustrates another image processing technique that is used in MPEG decoders. According to this technique a block 122 is regenerated, which not only does not align itself with image block boundaries, but does not align itself with pixel boundaries either. As shown in FIG. 1E, this block is displaced both horizontally and vertically by one half-pixel position from block 110, shown in FIG. 1D. To regenerate block 122, a number of pixels larger than is contained in a single block is accessed. This is illustrated by the nine pixel by nine pixel block 120 of FIG. 1E. As shown in FIG. 1E, it is desirable for an MPEG decoder to be able to access image data in blocks which are larger than the eight by eight pixel block size used by the MPEG-2 algorithm.

SUMMARY OF THE INVENTION

The present invention is embodied in a multi-image memory system in which image data are interleaved to provide efficient access for fetching reference image data and for fetching data to be displayed.

According to one aspect of the invention, the multi-image memory includes a plurality of memory banks and corresponding image data from different fields of an interlace-scan image frame are stored in respectively different memory banks.

According to another aspect of the invention, the image data includes separate luminance and chrominance components, the memory system includes multiple channels and data representing respective image components are written into the memory in respectively different channels. The channel assignment is changed for consecutive macroblocks.

According to yet another aspect of the invention, the memory subsystem includes multiple address generators which operate in parallel to produce multiple address streams that are overlapped to implement interleaved memory fetch operations for reference image data.

According to yet another aspect of the invention, the decoder includes first and second video output channels and the memory subsystem includes multiple address generators which operate in parallel to provide respectively different image data to the first and second video output channels.

According to yet another aspect of the invention, the memory subsystem includes an input buffer which is dynamically reconfigured to process images having differing numbers of image pixels.

According to yet another aspect of the invention, the decoder operates in multiple modes and the input buffer has one display buffer in one operational mode and two display buffers in another operational mode.

According to yet another aspect of the invention, the memory subsystem includes interfaces for storing and retrieving encoded bit-stream data into the memory, storing decoded image data, fetching reference image data, fetching display image data and moving blocks of data between different locations in the memory and the memory subsystem includes a controller which prioritizes the various memory access operations.

BRIEF DESCRIPTION OF THE DRAWINGS

FIGS. 5A, 5B, and 5C are memory buffer diagrams which show exemplary memory allocation schemes for the input memory buffer shown in FIG. 2B.

FIGS. 18A and 18B are memory layout diagrams which are useful for describing the process of fetching reference macroblocks that are distributed across memory row and memory bank boundaries.

FIGS. 19A and 19B are memory sequencing diagrams which are useful for describing different phases for fetching reference macroblocks from the memory shown in FIG. 2C.

DETAILED DESCRIPTION OF THE INVENTION

Figure 2A:
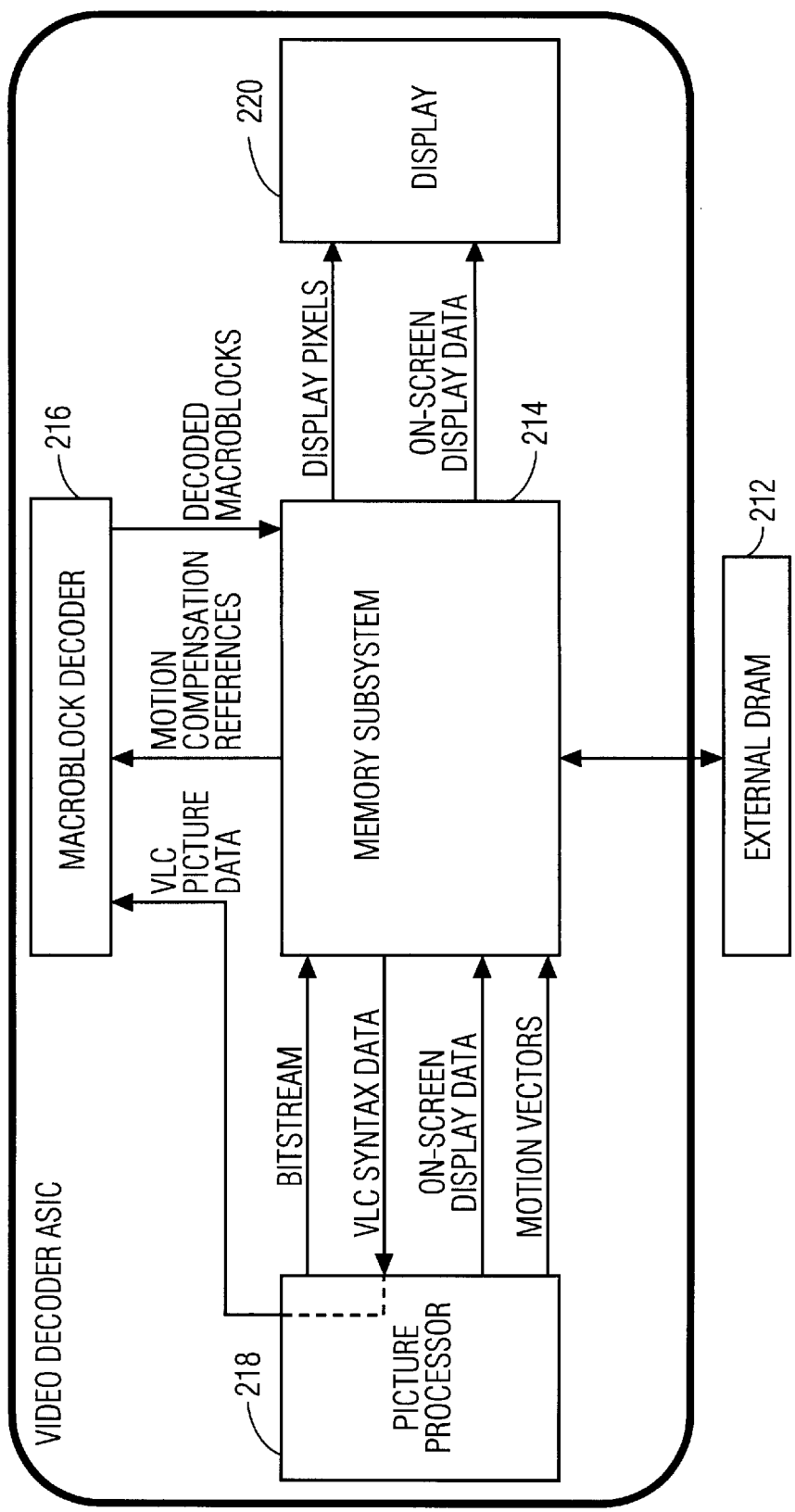
FIG. 2A is a block diagram of an image processing apparatus which includes a multi-image memory and memory subsystem according to the present invention.

FIG. 2A is a block diagram of an image processing system which includes a multi-frame memory 212 and a memory subsystem 214 in accordance with the present invention. The system shown in FIG. 2A includes a picture processor 218 which receives data from and provides data to the multi-frame memory 212 via the memory subsystem 214. A macroblock decoder 216 receives and decodes encoded macroblocks The memory subsystem 214 is also coupled to a display processor 220 which, using the memory subsystem 214, fetches data from the memory 212 and generates pixel data for display on a display device (not shown). The display processor 220 causes decoded image data and, optionally, image data for an on-screen display (OSD) image to be displayed on the display device.

In the exemplary embodiment of the invention shown in FIG. 2A, the multi image memory 212 is arranged in rows and columns of pixel storage areas. These rows and columns do not necessarily correspond to the rows and columns of the stored images. To distinguish between them, the rows and columns of the memory 212 are referred to as "memory rows" and "memory columns" while the rows and columns of an image are referred to as "image rows" and "image columns."

Figure 2B:
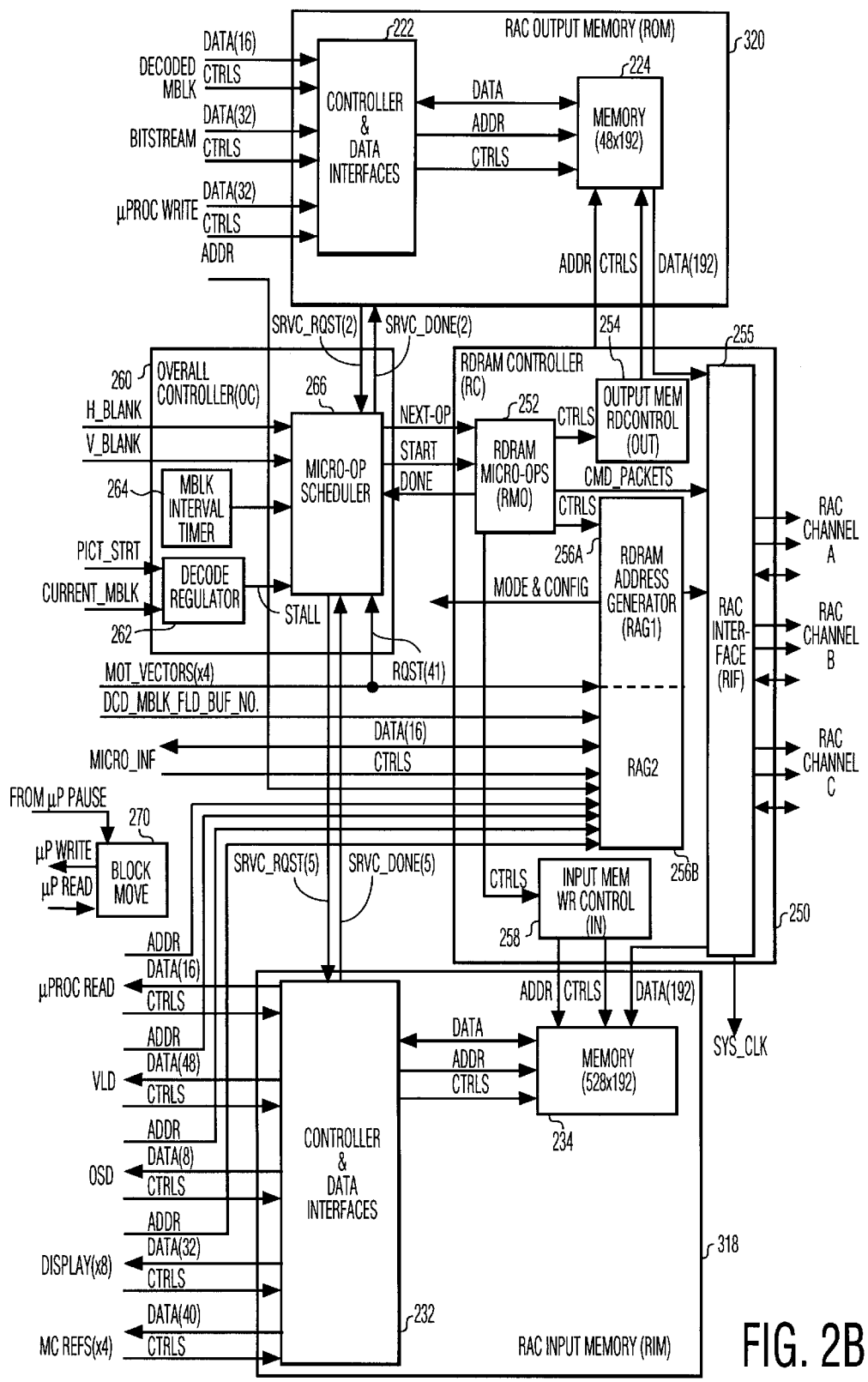
FIG. 2B is a block diagram of an exemplary memory subsystem suitable for use in the image processing apparatus shown in FIG. 2A.
Figure 2C:
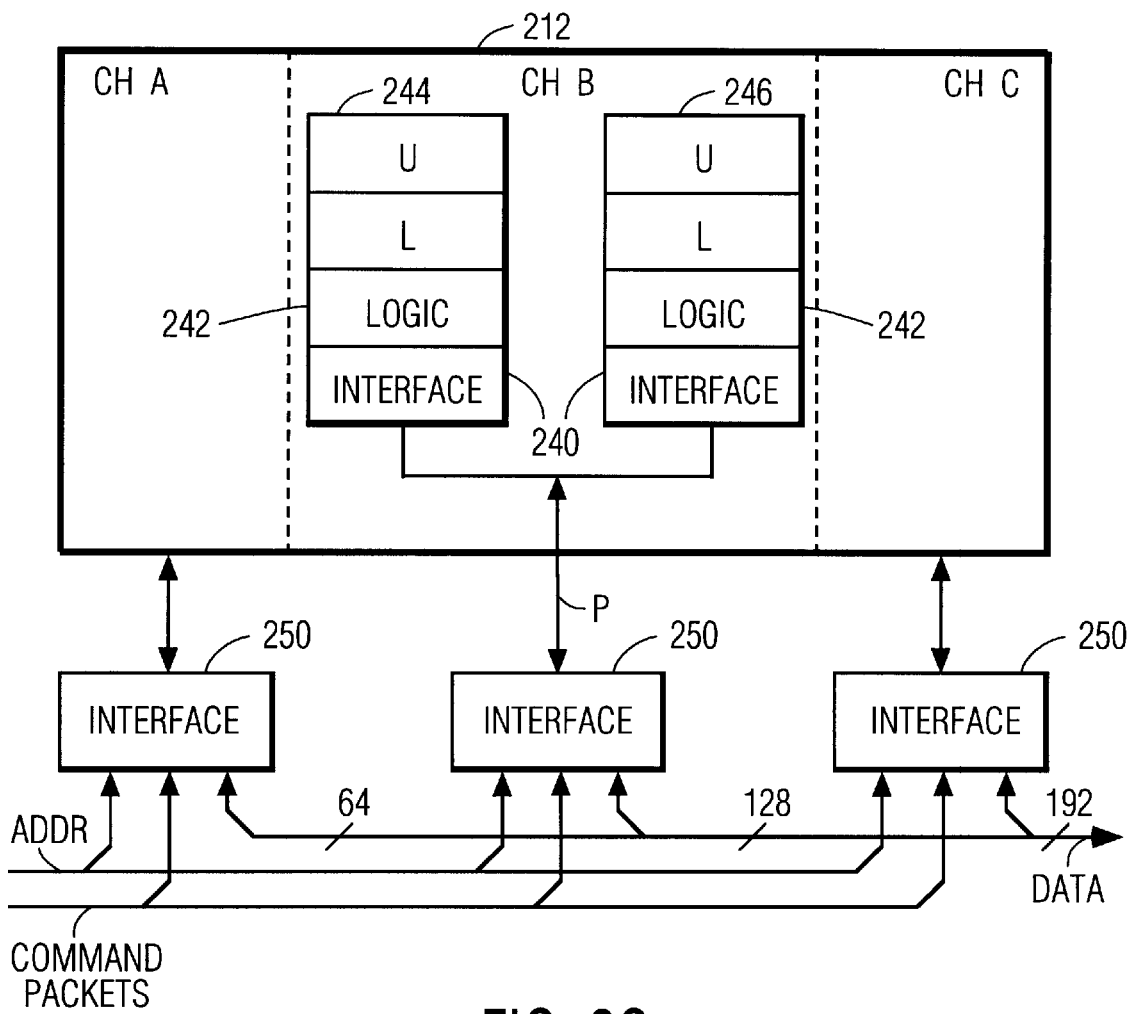
FIG. 2C is a block diagram of a multi-image memory suitable for use in the image processing apparatus shown in FIG. 2A.

FIG. 2C is a block diagram which shows an exemplary three channel RDRAM memory configuration that may be used as the memory 212. Details of only one of the channels (channel B) are shown in FIG. 2C. The memory is shown as including a single port, P, through which data are transferred between the memory 212, on one hand, and macroblock decoder 216, the picture processor 218 and display processor 220 on the other hand through the memory subsystem 214.

As shown in FIG. 2C, each channel (A, B and C) includes one or two memory devices, 244 and 246 which hold the actual data. Each memory device, in turn, is divided into two banks, an upper bank (U) and a lower bank (L). The data in each of the channels is arranged in memory rows, each memory row including, for example, 2,048 bytes of data (in an alternative embodiment of the invention, each row includes 1,024 bytes of data). An entire memory row is accessed at once by logic circuitry 242. Since the memory 212 includes three channels, an access to a single memory row results in 6,144 bytes of data being stored.

In the memory system shown in FIG. 2C, the data for a single a memory row is accessed from a single bank of a single device. Thus, if the channel includes two devices, a memory access for data in the channel may address four memory rows with the same row number. These memory row addresses are differentiated by which bank and which device are used to access the row of data. When a row of data has been addressed and accessed, it is stored in a cache (not shown) internal to the memory interface 240. Subsequent attempts to access data in the same memory row are satisfied from the cache. The logic circuitry 242, responsive to an address value provided by the memory subsystem 214, selects the proper device and bank to be used for a particular memory access and provides data to, or receives data from an interface circuit 250. The interface circuitry receives address values and command packets from the memory subsystem 214, provides data values to and receives data values from the memory subsystem 214. The operation of the memory subsystem is described below with reference to FIG. 2B.

The exemplary memory system shown in FIGS. 2B and 2C transfers data at a rate of 24 bytes (192 bits) for each period of the 62.5 MHz system clock signal which is used by the picture processor 218 and display processor 220. The rate at which data for an entire image is accessed may be optimized by interleaving the data in the banks of the memory devices that make up the memory 212, such that successive groups of eight bytes of data are held in a respectively different one of the four memory banks in the channel. In the memory device shown in FIGS. 2B and 2C, each channel provides "eight bytes" (i.e. one "octbyte") of data for each period of the system clock signal. If both chrominance data and luminance data are being transferred, then two channels provide a total of 16 bytes of luminance data and the remaining channel provides eight bytes of chrominance data (i.e. either the Cb or Cr color difference signal). If only luminance data or only chrominance data is being provided, then all three channels are used to provide either luminance data or chrominance data. In some image storage formats, data from less than three channels may be needed. In this instance, all three channels are accessed but the data from the unused channel or channels is ignored.

The exemplary memory shown in FIG. 2C transfers data between the interfaces 250 and the channels A, B and C at a rate of 250 MHz via the bi-directional memory port P, with one byte of data being transferred in each channel coincident with each transition of the 250 MHz clock signal. Thus eight bytes (one octbyte) of data are transferred through each channel in each period of a 62.5 MHz system clock signal.

Figure 3A:
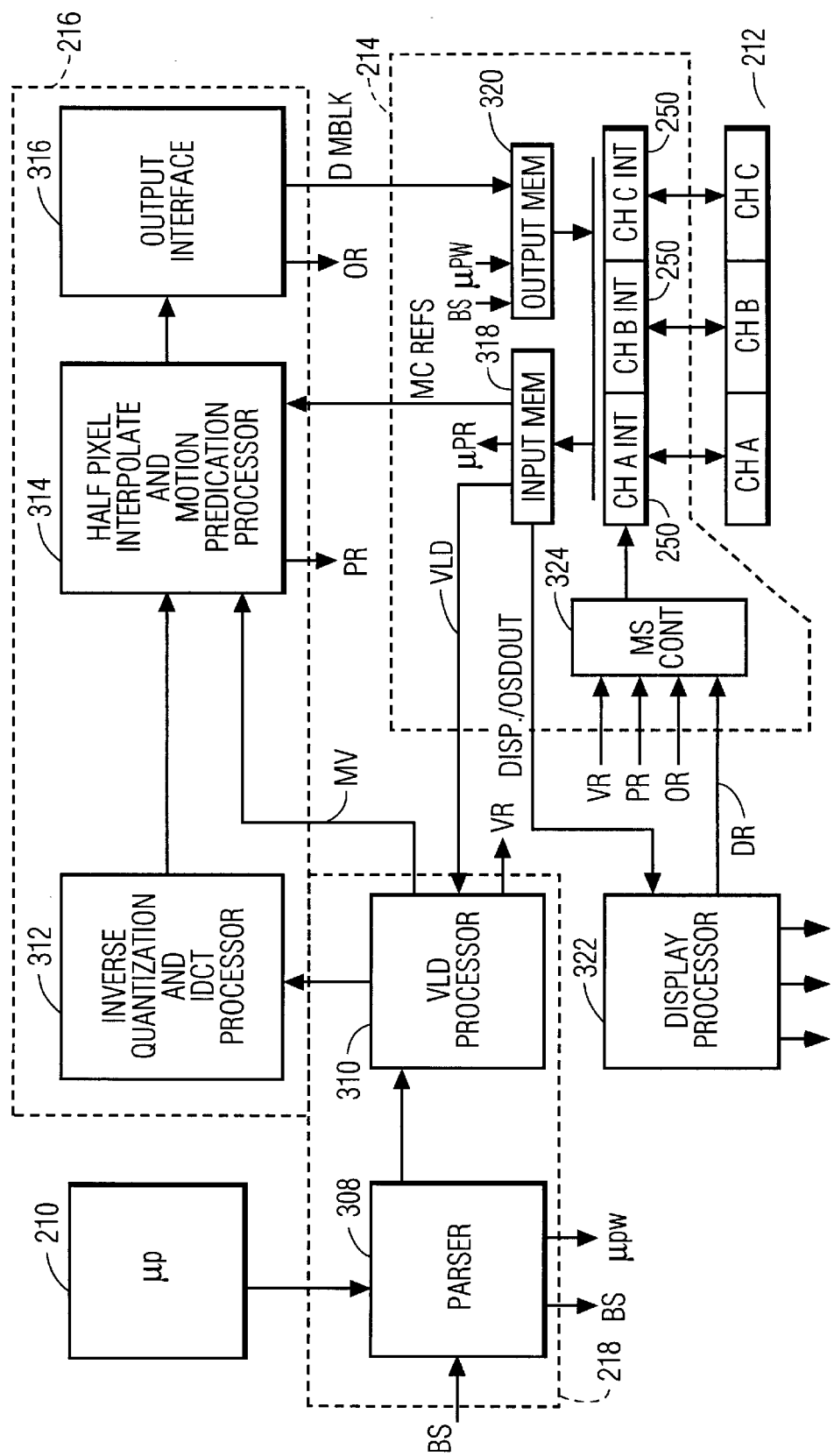
FIG. 3A is a block diagram of an MPEG decoder which includes an embodiment of the present invention.

FIG. 3A is a block diagram which shows details of the picture processor 218 and macroblock decoder 216 shown in FIG. 2A. The processing system shown in FIG. 3A is a decoder which decompresses image information that has been encoded according to the ATSC standard.

The picture processor 218 includes a parser 308 which receives the encoded bit-stream and provides an interface between the decoding system and the microprocessor 210. The processing system shown in FIG. 3A also includes a variable length decoding (VLD) processor 310, an inverse quantization and inverse discrete cosine transform (IDCT) processor 312, a half-pixel interpolation and motion prediction processor 314, an output interface 316 and a display processor 322. The parser 308 and VLD 310 form the picture processor 218, shown in FIG. 2A. The inverse quantization and inverse discrete cosine transform (IDCT) processor 312, half-pixel interpolation and motion prediction processor 314 and output interface 316 form the macroblock decoder 216 shown in FIG. 2A.

The memory system 212 interfaces with the picture processor 218 and macroblock decoder 216 through an input memory 318 and an output memory 320. The image processing system shown in FIG. 3A includes the memory subsystem 214 (described below with reference to FIG. 2B), which includes the memory subsystem controller 324, the input memory 318, output memory 320 and the memory interfaces 250.

In the system shown in FIG. 3A, bit-stream data is received by the parser 308 which collects the bit-stream data into 192 bit words in the output memory 320. These 192-bit words are then written into a bit-stream buffer in the memory 212. In the exemplary embodiment of the invention, the bit-stream buffer is implemented as a circular queue having approximately 10 million bits of data storage. The parser 308 also recognizes MPEG start codes in the bit-stream and provides, to the microprocessor 210, pointers to these start codes in the memory 212. In the exemplary embodiment of the invention, the microprocessor 210 uses these start codes to process header information for the sequence, group of pictures and picture records in the bit-stream. In an alternative embodiment of the invention, this header information may be processed by the VLD processor 310.

The variable length encoded bit-stream data is provided from the memory 212 to the VLD processor 310 which separates the side information, such as the motion vectors, MV, and quantized DCT coefficient data from the bit-stream. The quantized DCT coefficient data is provided to the inverse quantization and IDCT processor 312 while the motion vectors are provided to the half pixel interpolator and motion prediction processor 314.

The processor 312 converts quantized DCT coefficients, recovered from the bit-stream by the VLD processor 310, into pixel values and passes eight-pixel by eight-pixel blocks of data values to the processor 314. If the blocks have been encoded using motion compensation techniques, these data values are residual values which are to be added to values of a reference block from a previously decoded frame in order to produce the final pixel values. This summation is performed in the half pixel interpolate and motion prediction processor 314. The processor 314 fetches a reference block from the memory 212 and combines it with the residual pixel values provided by the Inverse Quantization and IDCT processor 312.

Figure 1A:
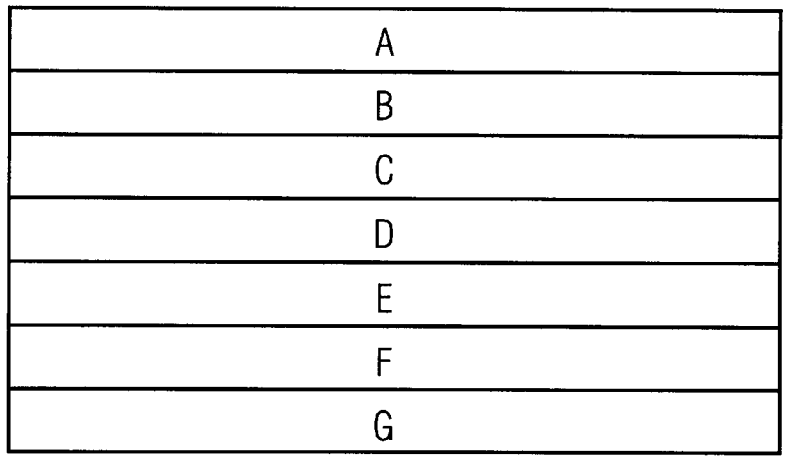
FIG. 1A (prior art) is a diagram of an exemplary decoded MPEG image.
Figure 1B:
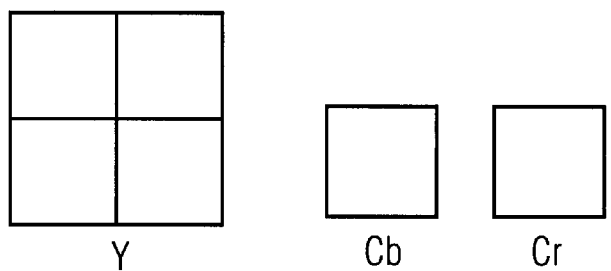
FIG. 1B (prior art) is a diagram which illustrates the structure of an MPEG macroblock.
Figure 1C:
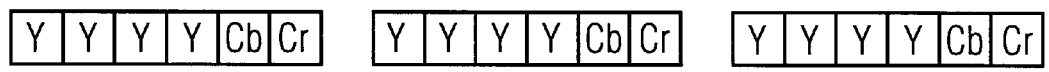
FIG. 1C (prior art) is a data stream diagram which illustrates a sequence in which decoded image data is provided by an MPEG decoder.
Figure 1D:
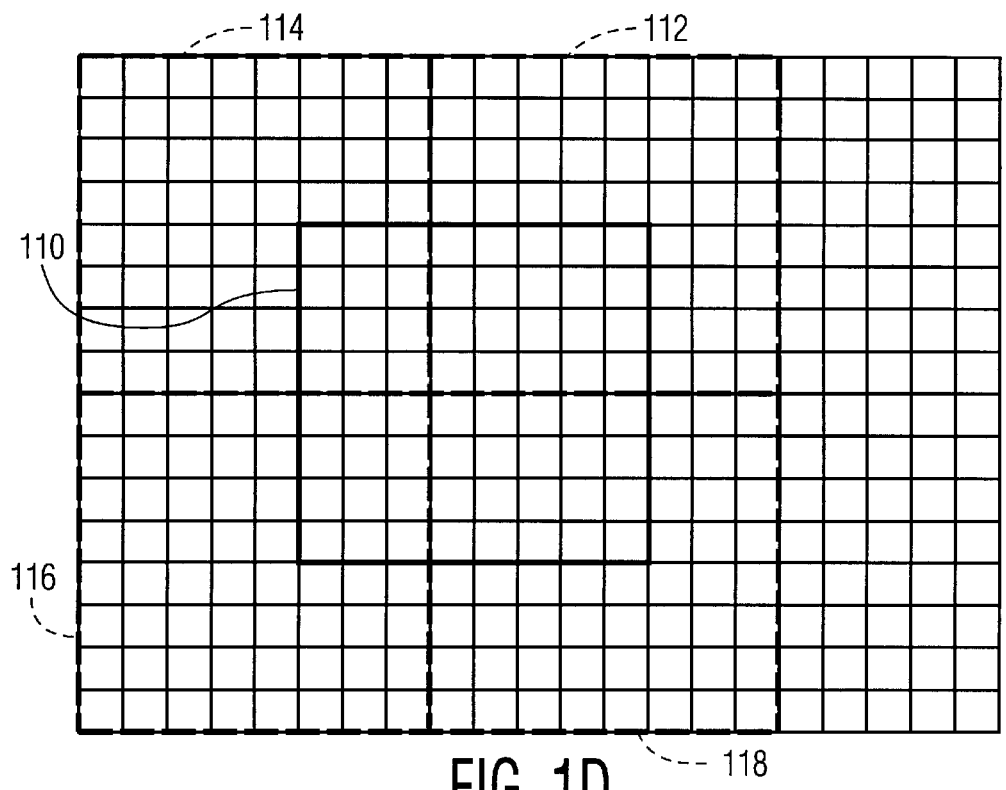
FIG. 1D is an image diagram which shows the extraction of a non-aligned block of pixels defined from among aligned blocks of pixels.
Figure 1E:
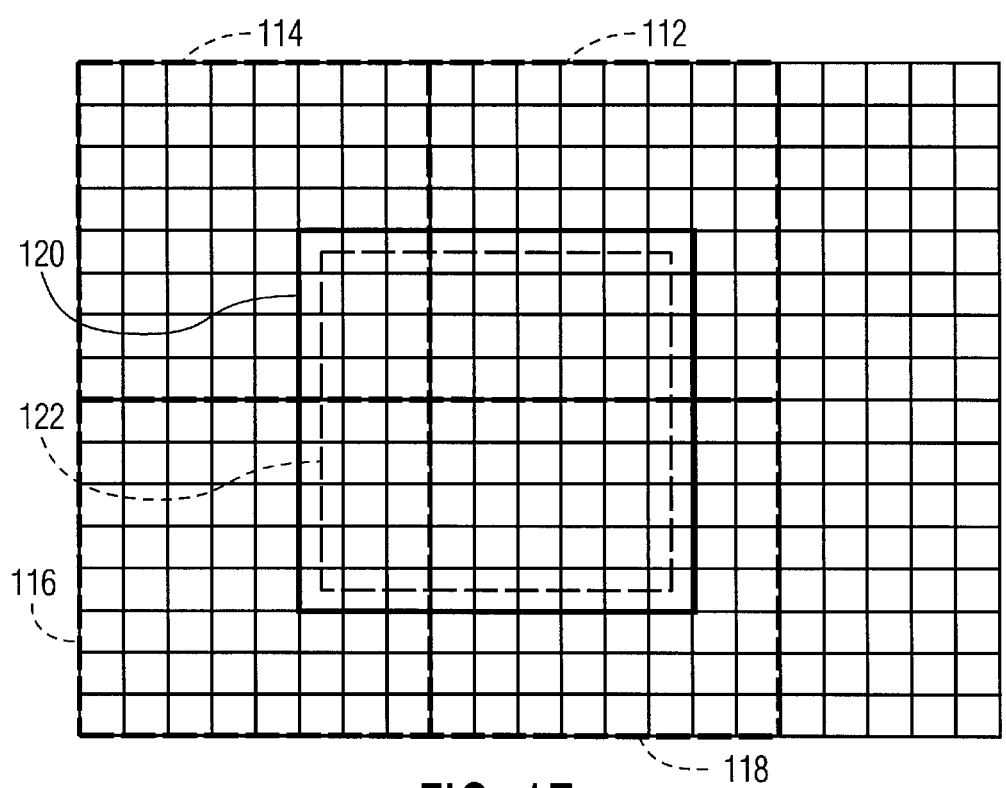
FIG. 1E is an image diagram which shows the extraction of an interpolated block of pixels defined from among aligned blocks of pixels.

To obtain a reference block, the processor 314 may need to interpolate between reference blocks in two different frames, a forward frame and a backward frame. In order to obtain a reference block, such as the reference block 122 shown in FIG. 1E which is displaced by one-half pixel position both horizontally and vertically with respect to the reference block 110 shown in FIG. 1D, the processor 314 may need to interpolate between adjacent pixels in a single frame. To perform both of these interpolation operations, the processor 314 fetches four half-macroblocks of data, one half-macroblock from each field in the forward and backward reference image frames stored in the memory 212 Each fetched half-macroblock is larger by one pixel position in each direction than a conventional field half macroblock of pixels. Fetches are in units of one-half macroblock because the stored images may be frames or fields. Only the upper or lower half macroblocks may be fetched to decode a field image while both the upper and lower half macroblocks are fetched to decode a frame image.

The decoded image data is provided to the memory 212 from the output interface 316 via the output memory 320. In the exemplary embodiment of the invention, the input memory 318 receives 192 bits of data from the channel interfaces 250 and then provides this data to one of the processors 310, 314 and 322 in smaller groups of bits (e.g. 24-bit data words). In the same way, the output memory 320 collects data from the output interface 316, parser 308 or microprocessor in relatively small increments (e.g. 24 bits) and provides 192 bits of data to the channel interfaces 250.

When each block of pixels has been processed by the half pixel interpolate and motion prediction processor 314, it is passed to the output interface 316 which collects blocks of pixels for storage into the memory 212 via the output memory 320. The output interface 316 buffers blocks of pixel values so that they may be transferred to the output memory 320. As described above, the data path between the output interface 316 and the output memory 320 may be implemented as a 24-bit bus while the data path between the output memory 320 and the interface circuits 250 is a 192-bit bus.

When decoded pixel data stored in the memory 212 is to be displayed, it is accessed by the display processor 322 via the input memory 318 and the memory interface ASICs 250. While data may be accessed one block at a time for display, typically only one line of pixels from the block is used during any one access. In addition, in order to properly reconstruct color pixel values, both the luminance data and the chrominance data for the lines of pixels are accessed together.

Each of the processors 310, 314, 316 and 322, produces respective control signals, VR, PR, OR and DR, which are applied to the memory subsystem control circuit 324 to control the storing and fetching of data from the memory 212. FIG. 2B (described below) is a block diagram of circuitry suitable for use as the memory subsystem 214.

Figure 3B:
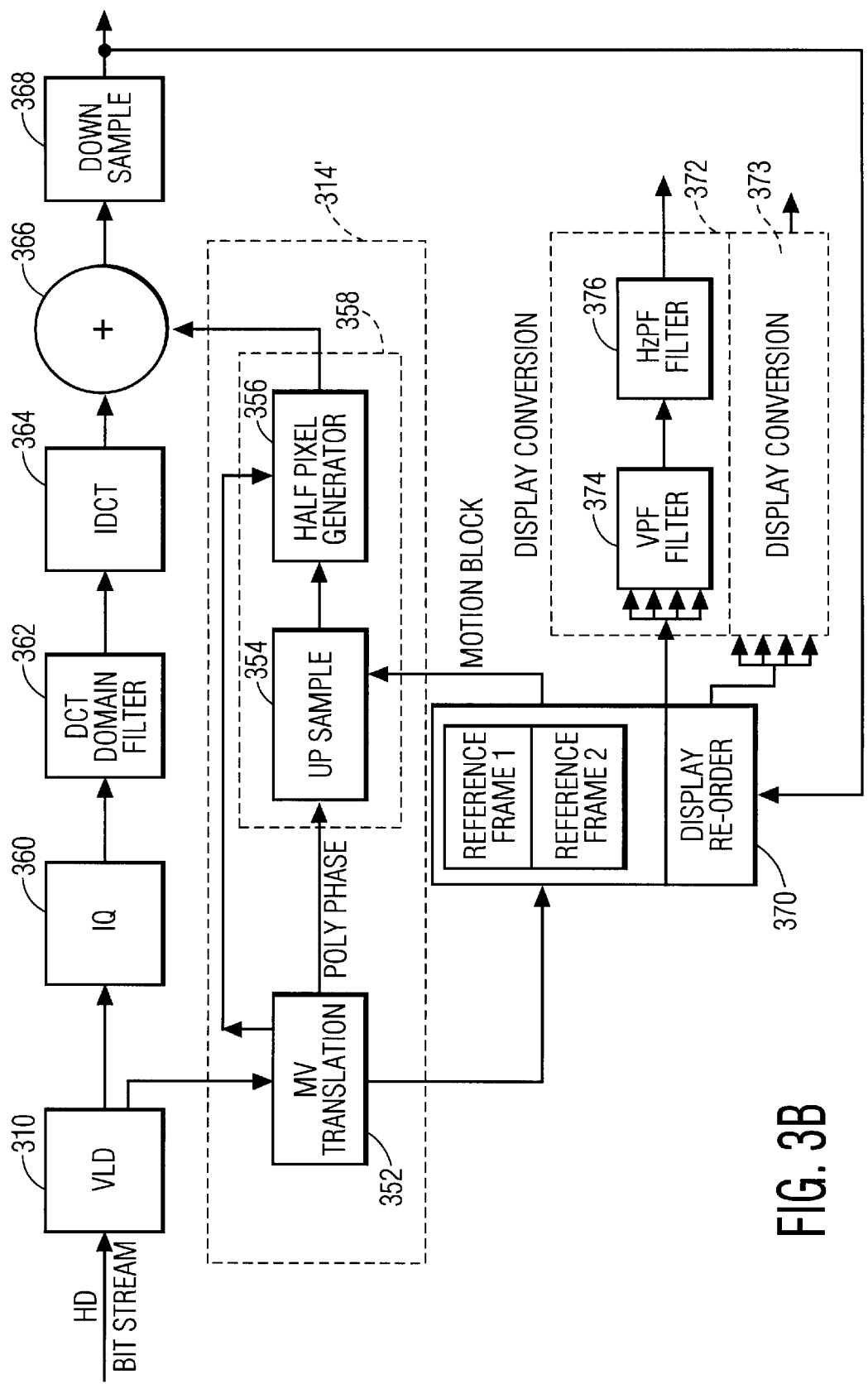
FIG. 3B is a block diagram of an alternative MPEG decoder which includes an image downconversion feature.

FIG. 3B shows an exemplary downconversion decoder which may be used with the memory system shown in FIGS. 2A, 2B and 2C. As shown in FIG. 3B, the down conversion system includes a variable length decoder (VLD) 310, an inverse quantizer 360, and inverse discrete cosine transform (IDCT) processor 364. The VLD 310 performs the same functions as the VLD 310 shown in FIG. 3A. The inverse quantizer 360 and IDCT 364 perform the same functions as the processor 312 shown in FIG. 3A In addition, the down conversion system includes a down conversion filter 362 and down sampling processor 368 which reduces the resolution of the decoded pictures. While the invention is described in terms of an exemplary embodiment which processes a MP@HL encoded input signal, the present invention may be practiced with any digitally encoded image bit stream.

The down conversion system also includes a motion compensation processor 314' including a motion vector (MV) translator 352, a motion block generator 358 including an up-sampling processor 354, half-pixel generator 356, and a memory system 370. The half pixel interpolator and motion prediction processor 314 of FIG. 3A include all of these elements except for the MV translator 352 and the up-sampling processor 354. The memory system 370 corresponds to the combined memory subsystem 214 and external DRAM 212, shown in FIGS. 2A and 2B.

The exemplary decoding system shown in FIG. 3B also includes a Display Conversion Block 372 having a vertical programmable filter (VPF) 374 and horizontal programmable filter (HZPF) 376. The display conversion block 372 converts downsampled images into images for display on a particular display device having a lower resolution than the original image.

The down conversion filter 364 performs a horizontal lowpass filtering of the high resolution (e.g. Main Profile, High Level) DCT coefficients in the frequency domain. The down sampling processor 368 eliminates spatial pixels by decimating the filtered Main Profile, High Level picture to produce a set of pixel values which can be displayed on a display device having lower horizontal resolution than that required to display an MP@HL picture. The exemplary memory 370 stores the spatial pixel values corresponding to at least one previously decoded reference frame having a resolution corresponding to the down-sampled picture. For decoding interframe encoded macroblocks, the MV translator 352 scales the motion vectors for each macroblock of the received picture consistent with the reduction in resolution, and the high resolution motion block generator 358 receives the low resolution motion blocks provided by the memory 370, upsamples these motion blocks and performs half-pixel interpolation as needed to provide motion blocks having pixel locations which correspond to the decoded and filtered differential pixel macroblocks.

Note that in the down conversion system of FIG. 3B the downsampled images are stored rather than high definition images, resulting in a considerable reduction of memory and memory transfer bandwidth required for storing reference and display images. Note also that the memory system 370 provides image data from four lines at a time to the display conversion processor 372. The system shown in FIG. 3B includes an optional second display conversion processor 373. In the exemplary embodiment of the invention, the second processor 373 provides a standard definition interlace-scan output signal while the processor 372 provides a high definition interlace-scan signal or a high-definition or standard-definition progressive scan signal.

The operation of an exemplary embodiment of the down-conversion system of the present invention for intra-frame encoding is now described. The MP@HL bit-stream is received and decoded by VLD 310. In addition to header information used by the HDTV system, the VLD 310 provides motion vector information for each macroblock and quantized DCT coefficients for each block and macroblock.

Since the received video image represented by the DCT coefficients is a high resolution picture, the exemplary embodiment of the present invention lowpass filters the DCT coefficients of each block before decimating the high resolution video image. The inverse quantizer 360 provides the DCT coefficients to the DCT filter 362 which performs a horizontal lowpass filtering in the frequency domain by weighting the DCT coefficients with predetermined filter coefficient values before providing them to the IDCT processor 364. For one exemplary embodiment of the present invention, this filter operation is performed on a block by block basis.

The IDCT processor 364 provides spatial pixel sample values by performing an inverse discrete cosine transform of the filtered DCT coefficients. The down sampling processor 368 reduces the picture sample size by eliminating spatial pixel sample values according to a predetermined decimation ratio; therefore, storing the lower resolution picture uses a smaller frame memory compared to that which would be needed to store a decoded higher resolution MP@HL picture.

The operation of an exemplary embodiment of the down-conversion system of the present invention for predicted frames (P-frames) is now described. In this example, the current received image DCT coefficients represent the DCT coefficients of the residual components of the predicted image macroblocks. In the described exemplary embodiment, the horizontal components of the motion vectors for a predicted frame are scaled only horizontally since the low resolution reference pictures of previous frames stored in memory do not have the same number of pixels as the high resolution predicted frame (MP@HL).

Referring to FIG. 3B, the motion vectors of the MP@HL bit stream provided by the VLD 310 are provided to the MV translator 352 Each motion vector is scaled by the MV translator 352 to reference the appropriate prediction block of the reference frame of a previous image stored in memory 370. The usable size (number of pixel values) in the retrieved block is smaller than a block of the corresponding high resolution block used to encode the current image; consequently, the retrieved block is upsampled to form a prediction block having the same number of pixels as the residual block provided by the IDCT Processor 364.

The prediction block is upsampled by the up-sampling processor 354 responsive to a control signal from the MV translator 352 to generate a block corresponding to the original high resolution block of pixels, and then half pixel values are generated—if indicated by the motion vector for the up-sampled prediction block in the half pixel generator 356—to ensure proper spatial alignment of the prediction block. The upsampled and aligned prediction block is added in summing network 366 to the current filtered block, which is, for this example, the reduced resolution residual component from the prediction block. All processing is done on a half-macroblock basis. After the motion compensation process is complete for the current high-resolution macroblock, the reconstructed macroblock is horizontally decimated accordingly by the down sampling processor 368. This process does not reduce the resolution of the image but simply removes redundant pixels from the low resolution filtered image.

Once the downsampled macroblocks for an image are available, the display conversion processor 372 adjusts the image for display on a low resolution television display unit by filtering the vertical and horizontal components of the downsampled image in VPF 374 and HZPF 376 respectively. Details of the operation of the downconversion processor may be found in U.S. patent application Ser. No. 08/815,804 filed on Mar. 12, 1997, which is incorporated herein by reference for its teaching on MPEG downconversion processing.

The memory subsystem 214 is shown in detail in FIG. 2B. The memory subsystem 214 is controlled by an opcode processor 260 which receives instructions from the output memory 320 and the input memory 318 to control the transfer of data to and from the RDRAM 212. The output memory 320 includes three write ports, one for writing decoded macroblocks, one for writing bit-stream data provided by the parser 308 (shown in FIG. 3A) and one for writing the data that is stored using microprocessor write commands. The microprocessor write port is instrumental for the creation of on-screen display (OSD) images which, in the exemplary embodiment of the invention, are generated using the block-move processor 270, described below.

Data provided to the memory write ports is received by controller and data interfaces circuitry 222. This circuitry receives data and control signals from each port. The data is passed on to a buffer memory 224 and the control signals are converted to address and control signals for the buffer memory 224 and to service requests for the micro operation scheduler 266 of the overall controller 260. The decoded macroblock input port and the bit-stream input port do not include address values since data is provided in a known sequence to these ports. Thus, the storage location for the next 16 bits of a decoded macroblock that is provided to the macroblock input port is known as is the address for the next 32 bits of the bit-stream that is provided to the bit-stream input port. The microprocessor write port, however, is provided with an address into which the data provided by the microprocessor is to be written. This address value is provided to the RDRAM address generator 256 of the RDRAM controller 250.

Figure 4:
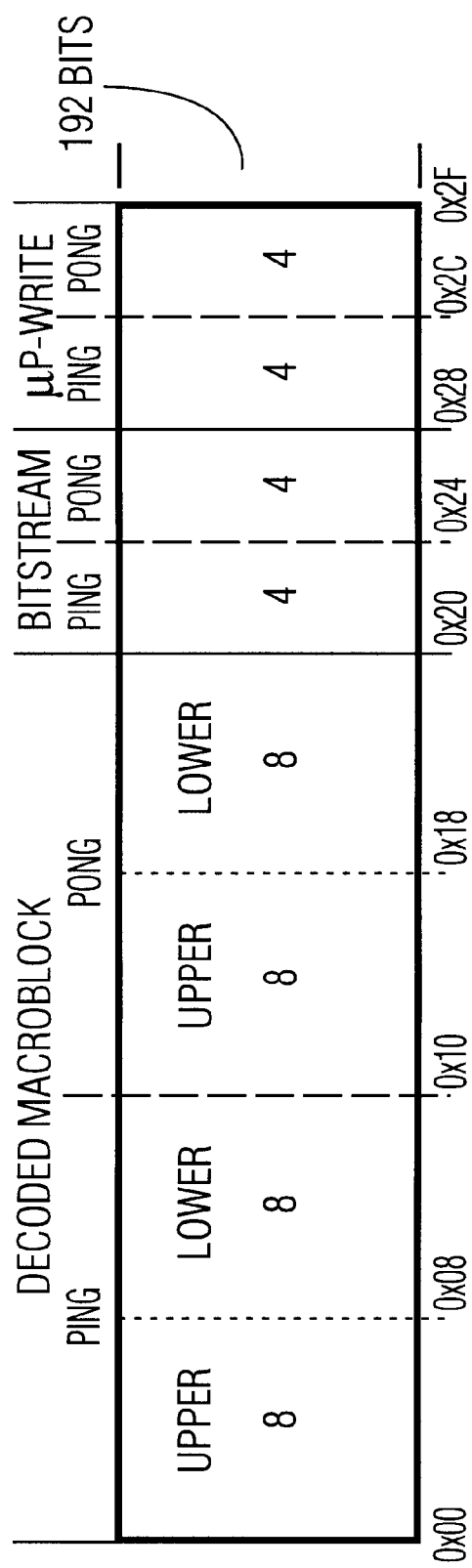
FIG. 4 is memory buffer diagram which shows an exemplary memory allocation scheme for the output memory buffer shown in FIG. 2B.

The exemplary buffer memory 224 of the output memory 320 holds 48 192-bit words. This memory is divided into three ping-pong buffer areas, one each for the decoded macroblock, bit-stream and microprocessor write data. The ping-pong buffers allow data to be written into one buffer area while it is read from the other for storage into the RDRAM memory 212. FIG. 4 is a memory diagram which illustrates an exemplary layout for the buffer memory 224.

As shown in FIG. 4, the memory includes 32 192-bit words for the four macroblock buffer areas. These areas are the ping-pong buffers for the upper and lower half macroblocks respectively. Pixel data values are stored into the memory in half-macroblocks to allow both field-based images and frame-based images to be decoded. Under the MPEG-2 standard, a macroblock of an interlaced image is stored such that the half macroblock corresponding to first field is in the upper half of the macroblock while the half macroblock corresponding to the second field is in the lower half of the macroblock. The bit-stream buffer area includes two four-word buffer areas as does the microprocessor-write buffer area as shown in FIG. 4.

Figure 14:
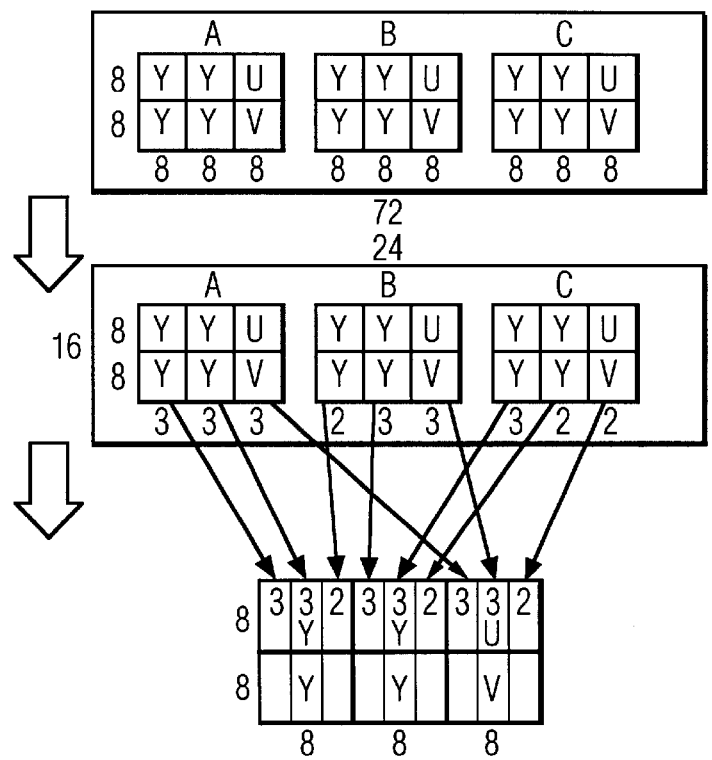
FIGS. 14 and 15 are macroblock transformation diagrams which are useful for describing the subsampling process performed by the downsampling processor shown in FIG. 3B.
Figure 15:
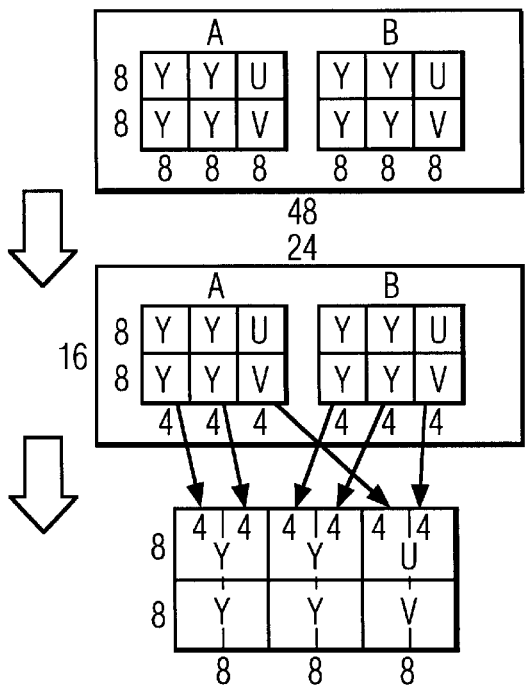

Although FIG. 3B shows the downsample processor 368 implemented as a separate device, it is contemplated that this processor may be implemented in the controller 222 of the output memory 320. FIGS. 14 and 15 illustrate exemplary downsampling methods for a three-to-one decimation and a two-to-one decimation, respectively. As shown in FIG. 14, each of the 8×8 blocks of pixel data is first subsampled to form either an 8×3 block of pixel data or an 8×2 block of pixel data and then the subsampled blocks are rearranged to form a single macroblock. FIG. 15 shows the similar operation for two-to-one decimation. In this instance, the 8×8 blocks are each reduced to 8×4 blocks and the 8×4 blocks are rearranged as shown to form a single macroblock. In the exemplary embodiment of the invention, the downsample process is implemented in the controller and data interfaces circuitry 222 which selects pixel values as shown in FIGS. 14 and 15 to store into appropriate locations of the decoded macroblock area shown in FIG. 4 as downconverted macroblocks.

In addition to the write ports, the memory subsystem 214 includes several read ports: a microprocessor read port; a VLD read port, through which the stored bit-stream data is retrieved from the memory 212; an OSD read port, through which OSD data that is to be overlaid on the displayed video image is provided to the display processor; eight display ports which provide the display data to the display processor 322, shown in FIG. 3A, and the display conversion processors 372 and 373, shown in FIG. 3B; and four motion compensation reference (MC REF) ports, through which the reference image data is provided to the motion prediction processors 314 and 314' shown in FIGS. 3A and 3B. As described above, the motion prediction processors use this data to decode predictively encoded (P) macroblocks or bidirectionally predictively encoded (B) macroblocks. The memory subsystem operates such that all of the read ports and all of the write ports may be active at any given time.

Figure 5A:
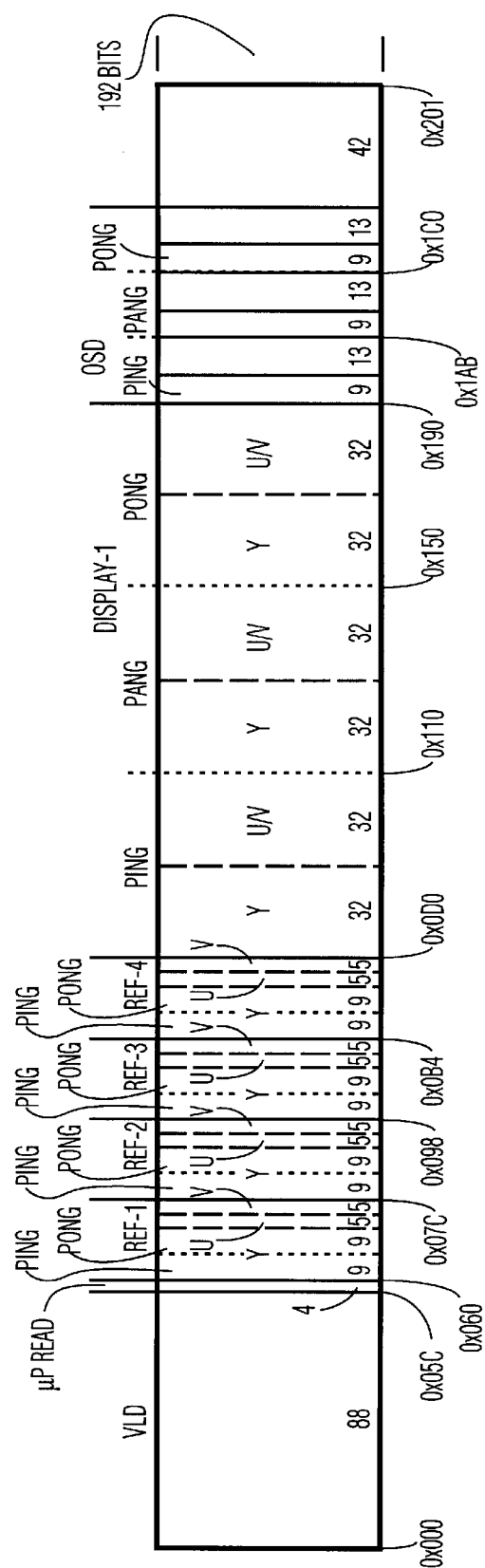
Figure 5B:
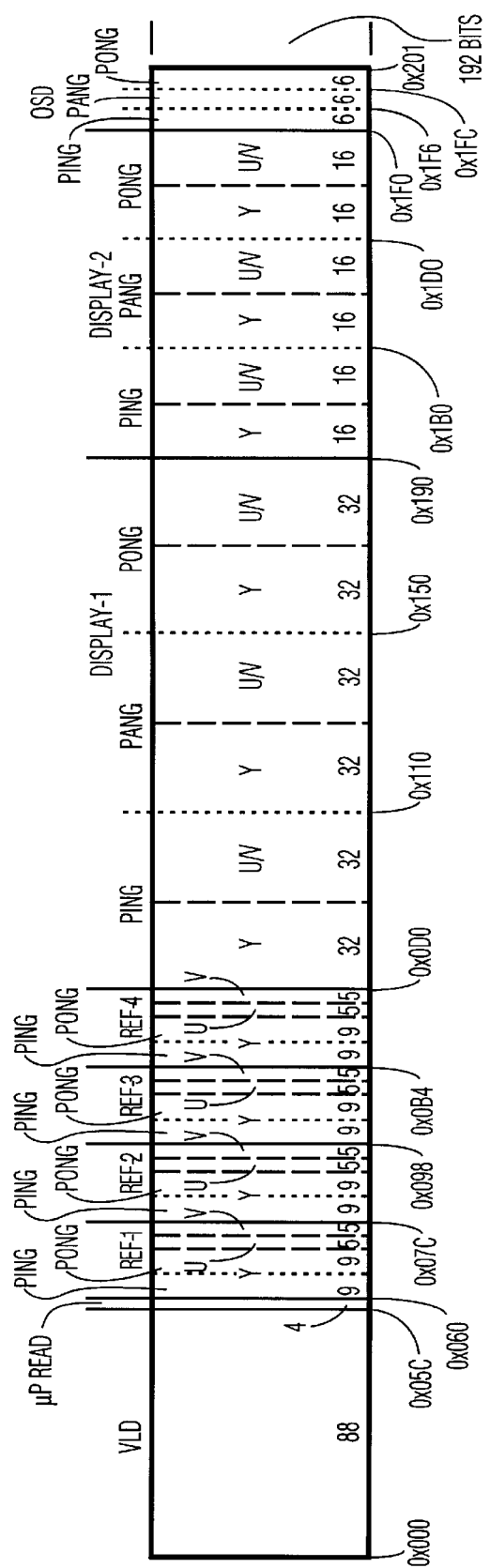

The exemplary input memory buffer 234 of the input memory 318 holds 528 words, each word having 192 bits. The buffer 234 is divided as shown in FIGS. 5A, 5B and 5C. The layout of the memory buffer 234 changes depending on the mode of operation of the decoder. The exemplary decoder shown in FIG. 3B may support two display conversion processors 372 and 373, processor 372 produces 1) a high definition interlace scan output or 2) high definition or standard definition progressive-scan output signal while processor 373 produces only a standard definition interlace scan output signal. Table 1 illustrates the various modes and the way in which the eight display output channels are used in each mode.

TABLE 1

| Mode | Display 1 | Max Res. | Display 2 | Max Res. |
| --- | --- | --- | --- | --- |
| Full Specifications | 1 line | 1125P | disabled | |
| Downconversion 1 | 4 lines | 525P | disabled | |
| Downconversion 2 | 4 lines | 525P | 4 lines | 525I |
| Downconversion 3 | 4 lines | 525P | 4 lines | 525I |
| Downconversion 4 | disabled | | 4 lines | 525I |

FIGS. 5A, 5B and 5C show the buffer layouts when the decoder is operated in Downconversion (DC) 1 mode; DC modes 2, 3 and 4; and Full Spec mode respectively. In all modes, the size of the VLD buffer, microprocessor read buffer and the reference image buffers REF-1 through REF-4 are the same. The Display 1 buffers for all of the modes are use the same amount of memory but for FS mode, the memory in the buffer is allocated differently. The major difference between the buffers is the provision of a Display 2 buffer for DC modes 2 and 3 and the size of the on screen display buffers.

FIG. 5C shows the buffer layout when the decoder is operating in full specification mode. In this mode, 88 words, each containing 192 bits, are reserved for the VLD data stream, 4 words for the microprocessor read, 112 words are reserved for the four reference macroblock read ports. These 112 words are divided into four buffers, each containing 28 words. The 28 words are divided into two 9 word buffers for the luminance signal and two 5 word buffers, one for the Cb signal (U) and one for the Cr signal (V). The two luminance buffers form a ping-pong buffer such that while the nine words of luminance data are being provided to processor 314 or 314' by one buffer, the input memory controller 232 (shown in FIG. 2B) transfers 9 words of data from the memory 250 into the other buffer.

In full specification mode, the input memory buffer 234 also includes 192 words for the display 1 port. These 192 words are divided into three groups to form a ping-pang-pong buffer. The display function of the memory is the most important since a fault in the display is the most visible. Accordingly, this function is provided with a triple buffer such that while one buffer is being emptied, a second buffer should be full and waiting to be emptied while the third buffer is being loaded. The triple buffer configuration ensures that, even if a display read operation is delayed, data is still available to be displayed.

Another purpose of the triple buffer is to support special display modes such as variable shrink, variable expand and side cut, where the data is displayed during one portion of the image at a rate that is greater than the fastest rate that the data can be supplied from memory. By initially filling the three buffers these special display modes can be supported even though the buffers are being emptied faster than they can be filled.

The final portion of the input memory buffer 234 is three 24-word segments which hold the on-screen display data.

These three segments also form a ping-pang-pong buffer which transfers data in concert with the display buffer.

In Downconversion modes 2 and 3, both of the display ports are enabled and the input memory 318 provides four lines to each port. Because display 1 provides progressive data and display 2 provides interlaced data, the buffer for display 1 is larger than for display 2. Each display 1 buffer includes 32 luminance words and 32 words for the chrominance (Cb and Cr) data. Each display 2 buffer, on the other hand, includes 16 luminance words and 16 chrominance words. The OSD buffer in this mode includes three 6 word buffers.

In Downconversion mode 4, the display 1 port is disabled and the display 2 port is served by three 24 word buffers. Each 24 word buffer includes 12 luminance words and 12 chrominance words.

Referring to FIG. 2B, the output memory 320 forms a packet interface between the memory 220 and the microprocessor 210, VLD processor 301 and half pixel interpolate and motion prediction processor 314. This memory receives data in words of less than 192 bits and concatenates the received data to produce a 192-bit packet that can be stored into the memory 212 in a single operation. For example, the microprocessor write port receives 32-bits data words and assembles six of these words into a 192-bit packet in the microprocessor write buffer, shown in FIG. 4. When between one and four 192-bit packets have been prepared, the controller 222 signals the micro-op scheduler 266 with a request to write data, and provides an address to the scheduler. At the same time, the controller 222 switches the ping-pong buffers so that the next data item is stored in the buffer that is not being written to memory. The controller 222 receives and schedules the request. The request may not be executed immediately because the memory may already be engaged in a higher priority operation, for example a display read operation or a memory refresh operation. The operation is queued, however, and during the next available interval it is executed.

The microprocessor 210 may store a single 32-bit value into the memory 212 by first reading the 192-bit word that contains the 32-bit word which is to be overwritten, using the input memory controller 232, and substituting the new 32-bit value for the appropriate 32-bit value provided by the input memory controller 232. The five existing 32-bit values and the one new 32-bit value are then written back into the memory 212 using the output controller 222.

The block move processor 270 uses a similar technique to copy blocks of data from one memory location to another. The processor is coupled to the controllers 222 and 232 (connections not shown in FIG. 2B) to request blocks of data using the microprocessor read port and to store blocks of data using the microprocessor write port. Thus the block move operations share the memory access ports that are used by the microprocessor. The block move processor, however operates as a slave to the microprocessor 210 which may inhibit block move operations when the microprocessor needs to access data in the memory 212. In this instance, the microprocessor asserts the pause signal, causing the block move processor to suspend its operations. In the exemplary embodiment of the invention, the microprocessor pauses the block move processor until the desired microprocessor access has been scheduled by the controller 222 or 232 and the overall controller 260.

The bitstream write operation is similar to the microprocessor write operation. 32 bit words are accumulated into four 192 bit packets in one of the ping-pong buffers of the bitstream write area and, when that ping-pong buffer is full, the controller 222 schedules a write operation and switches the ping-pong buffer areas.

The macroblock write operation is not as straightforward as the microprocessor write and bitstream write operations. Each of the buffer areas for the decoded macroblock write operation holds one macroblock, that is to say six blocks of image data, four luminance blocks and two chrominance block. Each of the buffer areas is divided into two eight-packet portions, an upper half-macroblock portion and a lower half-macroblock portion. The decoded macroblock write operation stores the luminance signal, Y, and the two chrominance signals, Cb and Cr into the memory 220 in a way that allows the data to be accessed quickly both for half-macroblock read operations and for display read operations. In addition, as described above, the downsampling operation of the downsampling processor 368 (shown in FIG. 3B) may be performed by the output memory controller 222, shown in FIG. 2B. The formatting of the data for storage into the memory 212 is described below with reference to FIGS. 13A and 13B.

Memory read operations are scheduled by the input memory controller 232 and compete with the memory write operations for access to the memory 212. The memory controller 232 attempts to keep the buffers shown in FIGS. 5A through 5C full in response to read request signals from the microprocessor 210, VLD processor 310, half pixel interpolate and motion prediction processor 314, display processor 322 and OSD processor (not shown). The VLD processor 310 processes the bitstream sequentially. Accordingly, the memory controller can continually refill the buffer areas as they are emptied by the VLD read requests so that bit-stream data is always available. Similarly, the sequencing of display data provided to the eight display ports is known to the controller and can be provided in the appropriate buffer area for timely access by the display processor. The OSD data is not always displayed and, consequently, is requested separately by the OSD processor. Since the timing of the OSD display is not as critical as the video data display, however, the OSD memory read requests can be queued and executed between higher priority memory operations. The microprocessor read operations are also given less priority than the VLD read operations and the video display read operations. These requests are also queued and executed as memory cycles become available between higher priority memory operations.

The read operations that recover the motion compensation half-macroblocks are scheduled before the data is needed by the half pixel interpolator and motion prediction processor 314 because the motion vectors are provided to the processor 314 at the same time that the encoded DCT coefficients are provided to the inverse quantization and IDCT processor 312. Thus, while the IDCT processor 312 is decoding the DCT coefficients, the motion prediction processor 314 or 314' may initiate the memory requests that fetch the appropriate reference half-macroblocks from the memory 212. As described above with reference to FIG. 6A, as many as four memory read operations may be used to fetch a single reference half-macroblock is from the memory 212.

Each picture is composed of a number of macroblocks which are sequentially decoded until the entire picture is completely decoded. Because decoding operations are largely repetitive from one macroblock to the next, it is convenient to use the minimum time interval used to decode a macroblock as a basic time unit for all memory operations. In the exemplary embodiment of the invention, this time is 241 periods of the 62.5 MHz system clock signal. Different memory operations are initiated at the beginning of a macroblock time. The display of image data, the fetching of reference macroblocks and the reading and writing of the bit-stream data have the highest priority and are scheduled at fixed macroblock intervals by the overall controller 260. Other memory access requests are queued by the overall controller 260 until the memory is not performing one of the high priority operations. For example, during the horizontal and vertical blanking intervals, no image data is displayed. Accordingly, microprocessor operations and OSD operations may occur during these intervals.

In addition, for lower-resolution image formats, some assigned macroblock periods may not include any decoding activities. Indeed, it is important to control the decoding operation for these lower-resolution formats to ensure that the VBV buffer does not underflow. One method for controlling the decoding operation is to use a linear counter (not shown) in the decode regulator 262 which generates a value that may be compared to the current macroblock that is being decoded. If the decoded macroblock number advances too far with respect to this linear counter, the decode regulator 262 asserts a stall signal to temporarily stop the decoder.

Figure 6A:
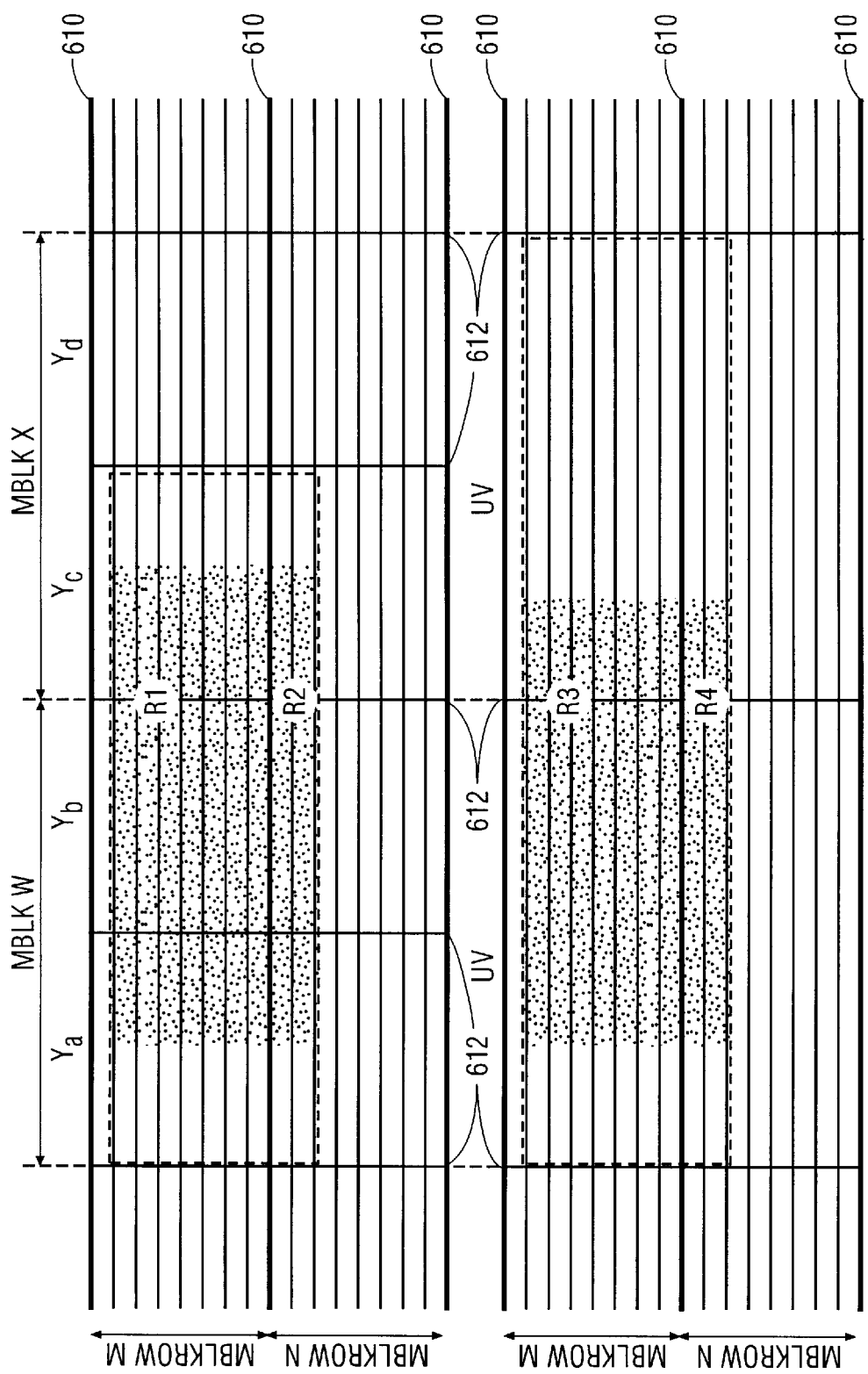
FIG. 6A is a memory diagram which is useful for describing the process of fetching a reference half-macroblock from the multi-image memory shown in FIG. 2C.

FIG. 6A illustrates an exemplary half-macroblock read operation in which, because the half-macroblocks are split across a memory row, four memory read operations are used to obtain the desired data. In FIG. 6A, the vertical lines 612 are block boundaries and the horizontal lines 610 are memory row boundaries. As shown in FIG. 6A, the half macroblock of data is read in four read operations. The read operations fetch the data in the dashed line boxes 614 and 618 even though only the data in the boxes 616 and 620 is needed. The first memory read operation fetches seven 192-bit words of luminance data from three blocks (Ya, Yb and Ya) in two contiguous macroblocks (macroblock W and macroblock X) in row M of the memory 212. The second memory read operation fetches two words of luminance data from three blocks in two contiguous macroblocks of row N of the memory 212. The third read operation fetches eight 192 bit words of chrominance data from two macroblocks in memory row M while the final read operation fetches two words of chrominance data from memory row N. Once the data is fetched, it is passed to the half-pixel interpolate and motion prediction processor 314 which extracts the blocks 616 and 620 that are used to regenerate the desired half macroblock motion block.

Figure 6B:
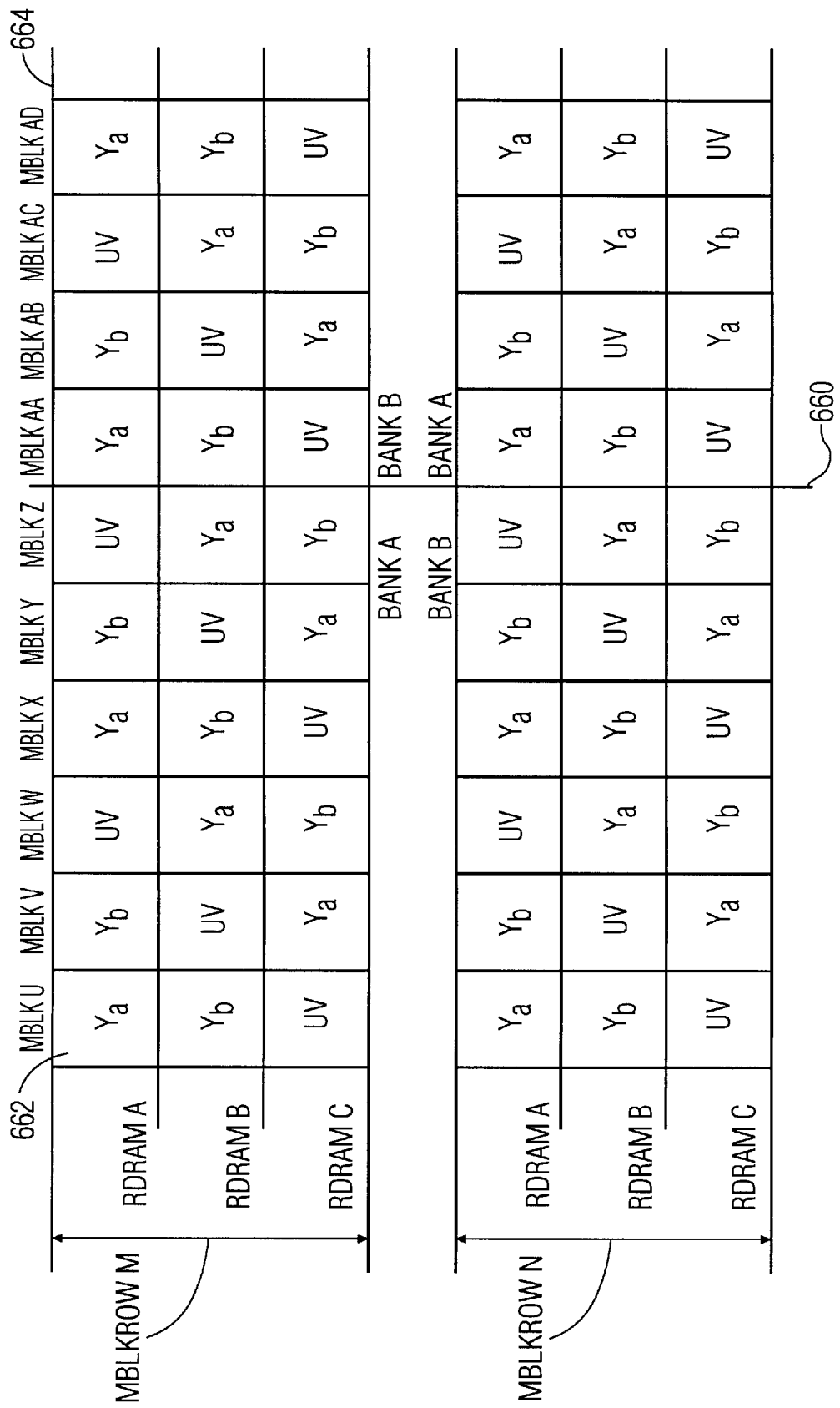
FIG. 6B is a memory layout diagram which is useful for describing the process of fetching a reference half-macroblock from the multi-image memory shown in FIG. 2C.

FIG. 6B shows an exemplary data storage format for image data in the memory 212. As shown in FIG. 6B, a single macroblock is stored across two memory rows (also called macroblock rows). The upper half macroblock, including the upper luminance blocks Ya and Yb and the upper halves of the two chrominance blocks, is stored in bank A of memory row M while the lower half macroblock is stored in bank B of memory row N. In addition, the order in which the blocks are stored in the memory is permuted from macroblock to macroblock among the three physical memory channels, A, B and C (corresponding to the memory devices A, B and C shown in FIG. 2C). This permutation allows data from horizontally adjacent macroblocks to be accessed, because corresponding data from the horizontally adjacent macroblocks components, for example the Ya portions of macroblocks U and V are stored in respectively different physical memory channels, A and C. Thus, data which spans two horizontally adjacent macroblock components can be accessed in a single memory access request by addressing the physical memory channels separately.

Figure 6C:
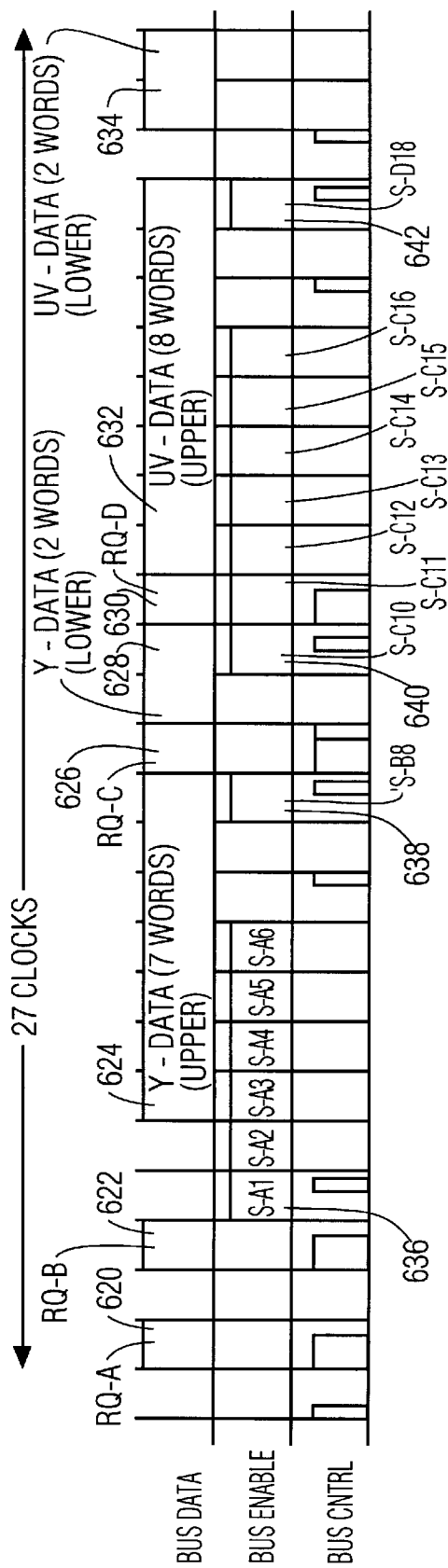
FIG. 6C is a timing diagram which, with FIGS. 6A and 6B, is useful for describing the process of fetching a reference half-macroblock from the multi-image memory shown in FIG. 2C.

The exemplary embodiment of the invention uses concurrent RDRAM which allows multiple memory requests to be queued and handled in sequence. FIG. 6C shows an exemplary memory sequencing operation which performs the memory access shown in FIG. 6A. The first step in the memory sequencing shown in FIG. 6C, step 620, is a request to read a first 192 bit word from the memory operation 1 shown in FIG. 6A. This word includes the second row of blocks Ya and Yb of macroblock W and the second row of block Ya of macroblock X. As shown in FIG. 6B, these block rows are stored in physical memories B, C and A, respectively and, so, may be accessed in a single memory request. This memory request brings into the cache in the memory 212, all of the data in blocks Ya and Yb of macroblock W and block Ya of macroblock X. The next step, step 622, requests the first row of blocks Ya and Yb from macroblock W and the first row of block Ya of macroblock X all from row N of the memory 212. As shown in FIG. 6B, these words are in physical memory channels B, C and A, respectively but are in a different bank from the corresponding blocks of macroblock W and, so, can be fully loaded into the cache of memory 212 because there is a separate cache for each combination of a bank and a channel.

The third step in the sequencing operation, step 636, requests words 2 through 7 of the macroblocks that were retrieved by the memory request 620. As set forth above, the request 620 places all of the bytes from blocks Ya and Yb of the upper half macroblock W and all of the bytes from block Ya of the upper half macroblock X into the cache in the memory 212. The serial addresses entered on the bus enable line at step 636 address the 192-bit words in the cache that contain this data. At step 624, the 7 words of Y data represented by memory operation 1 in FIG. 6A are available and are transferred into, for example, the REF 1 memory buffer area shown in FIG. 5a. While the data transfer 624 is occurring, a request, 638, is made on the bus enable line for the second row of the memory access 2, shown in FIG. 6A.

After step 624 is complete, the data stored in the cache of the upper bank of the memory may be discarded. At step 626, a request is made for the first row of blocks for memory access 3 shown in FIG. 6A. This memory access fetches the first of eight words from the upper memory bank in macroblock M. The data fetched is the chrominance data for macroblocks W and X, stored in physical RDRAM channels A and C, respectively. Although physical RDRAM channel B is also accessed by this memory request, the retrieved data is ignored. At step 628 of the memory sequencing operation, the two words requested at steps 622 and 638 are returned. Next, at step 640, the other seven words of chrominance data for memory access 3 shown in FIG. 6A are requested via serial addresses entered on the bus enable line. At step 630, a memory request for the first word of the two words in memory access 4 shown in 6A is issued. At step 632, the eight words requested at steps 626 and 640 are returned from the memory 212. At step 642, the second word of memory access 4 shown in FIG. 6A is requested and at step 634, the two words for memory access 4, which were requested at steps 630 and 642 are returned from the memory 212.

As illustrated by FIGS. 6A, 6B and 6C, the present invention permutes the macroblock components among the physical memory devices and the memory banks within the physical memory devices to allow reference half macroblocks which cross macroblock boundaries to be quickly retrieved. The four memory access operations described above occur in 27 periods of the 62.5 MHz clock signal. As shown in FIG. 6C, data are not available until five clock periods after the first request is issued. Accordingly, if a given sequence of memory access requests includes both access requests for five or more words and access requests for less than five words, it is advantageous to schedule the larger requests first such that the time required to complete the addressing functions of the smaller requests can overlap the fetching of data from the larger requests.

It may also be desirable to issue the memory operations in a different sequence when, for example, blocks of data that are split across macroblocks Z and AA are desired, as shown in FIG. 6B. The bank assignment for storing the macroblocks changes between these macroblocks. It may be desirable, for example, to fetch the chrominance data from macroblock AA first, the chrominance data for macroblock Z second, the luminance data for macroblock Z third and the luminance data for macroblock AA last. This preserves the alternation between banks A and B on successive memory read requests. This alternation is desirable so that alternate memory access requests may overlap.

In the exemplary embodiment of the invention, all four memory access requests shown in FIGS. 6A, 6B and 6C are the result of a single op-code provided by the input memory controller 232 to the micro-op scheduler 266 (both shown in FIG. 2B). The micro-op scheduler sequences the memory operations. Address information for the operations comes in part from the micro-op controller and in part from the motion vectors provided to the address generator 256 from the VLD processor 310 via the half pixel interpolate and motion prediction processor 314.

The RDRAM address generator generates the addresses both for the initial packet request and for the serial address requests for subsequent data that is brought into the cache by the initial packet request. As set forth above, however, multiple memory requests both to read and to write data may be queued at any given time and executed according to a predetermined priority scheme. The address generator 256 queues the addresses for these operations and the micro-op controller 266 selects a request and queues the corresponding micro-op instructions. The higher priority memory operations have fixed time intervals at which they can occur. These fixed time intervals are based on a worst possible scenario and, thus, there are often intervals in this schedule for which the assigned operation is not necessary. If for example, there is relatively little change in an image over several frames, the bit-stream data for those frames may be greatly reduced. Accordingly, some of the time intervals assigned to VLD read operations may be available for microprocessor write operations.

The controller 266 schedules a lower priority memory operation to occur only when the assigned higher priority memory operation is not in progress. The controller 266 and address generator 256 each includes storage areas to hold the queued requests. For example, when a request arrives at the microprocessor write port to do a write operation, the data to be written is sent to the output memory 224 and, at the same time, the address is stored into a register (not shown) within the address generator 256. When the request is actually processed, the address generator already has the starting address. For some operations, for example display read operations and decoded macroblock write operations, the memory requests are in a fixed sequence. For these requests, the address generator is given a starting address and it then sequences automatically until it is given a new starting address.

The exemplary address generator 256 includes two address generators, 256A (RAG1) and 256B (RAG2). The two address generators are used to achieve the full benefit of the interleaved transaction capability of the concurrent RDRAM memory 212. As described above with reference to FIG. 6C, a single memory access request may include two address sequences (request A and Request B or Request C and Request D) which are interleaved in order to fetch the desired information from the memory 212. These interleaved addresses allow the addressing functions of the memory requests to be pipelined in the concurrent RDRAM so that the data for the second request may be provided immediately after the data for the first request. In the exemplary embodiment of the invention, each of the two address generators processes one of the two interleaved requests. Thus, address generator 256A processes request A and then request C while address generator 256B processes request B and then request D. The operation of an exemplary address generator is described below with reference to FIGS. 16 and 17.

Figure 7:
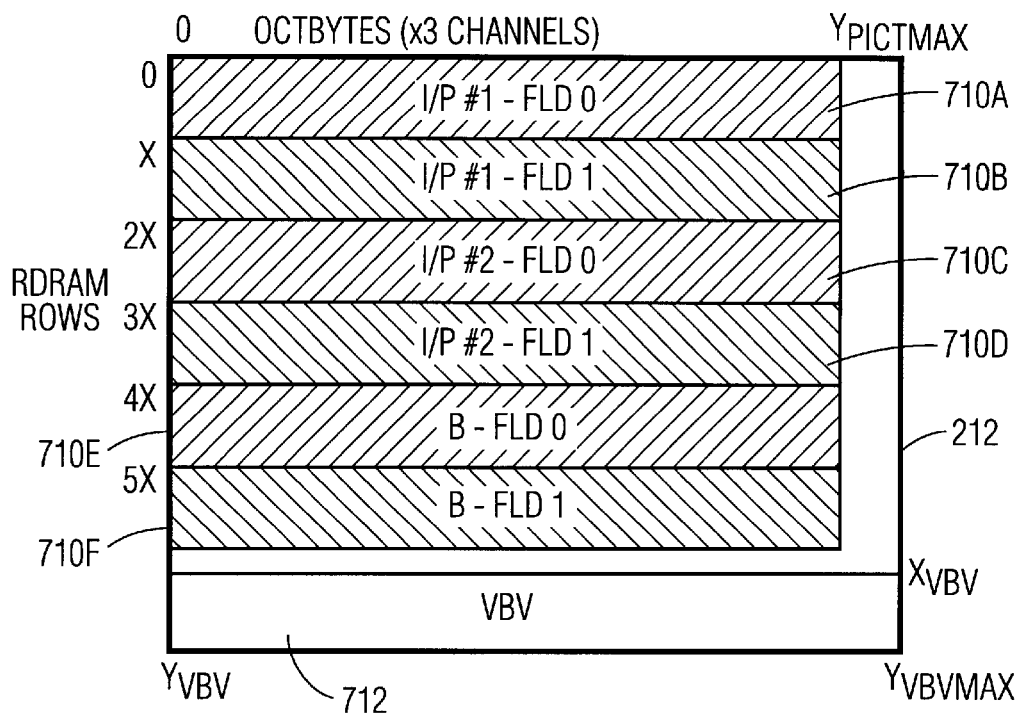
FIG. 7 is a memory layout diagram which shows an exemplary multi-image memory allocation scheme for the memory shown in FIG. 2C.

FIG. 7 is a memory map diagram which shows an exemplary memory allocation scheme for decoding and displaying a video image in full-specification (FS) mode. As shown in FIG. 7, in the exemplary embodiment of the invention, the image buffer area of the memory is divided into six field buffers, 710A through 710F. The present invention uses six field buffers although it is contemplated that a larger number of buffers may be used. In addition to the field buffers, the memory includes a bit-stream buffer (VBV) 712 which is allocated in the higher memory row addresses of the memory 212. The values of X and $Y_{PICT\ MAX}$ can change depending on the resolution of the video signal that is being decoded. Table 2 shows exemplary values, in units of memory rows for the X values and 192-bit words for the Y values when a 1125P image is decoded using a 96 Mbit memory 212.

TABLE 2

|  | 2K page size | 1K page size |
| --- | --- | --- |
| X | 272 | 544 |
| $Y_{PICTMAX}$ | 239 | 119 |
| $Y_{VBV}$ | 0 | 0 |
| $Y_{VBVMAX}$ | 255 | 127 |
| $X_{VBV}$ | 1828 | 3656 |
| $X_{VBVMAX}$ | 2047 | 4095 |

The exemplary memory layout leaves 14,647,296 bits of memory unallocated.

Figure 9:
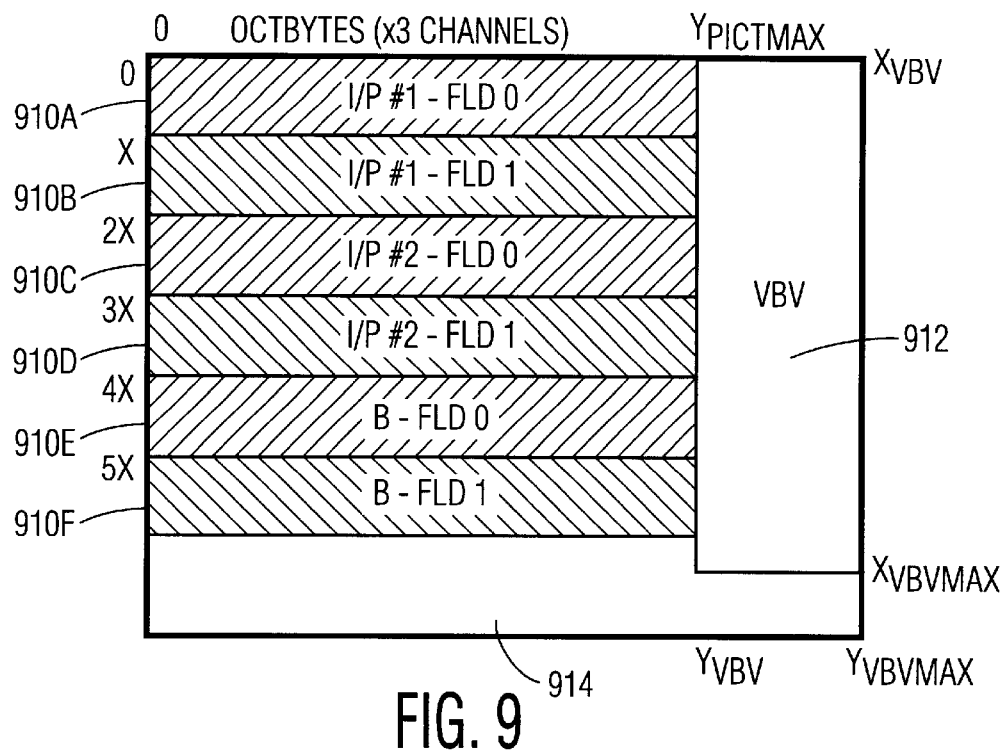
FIG. 9 is a memory layout diagram which shows an alternative multi-image memory allocation scheme for the memory shown in FIG. 2C.

FIG. 9 is an exemplary memory allocation scheme which may be used when the decoder is operated in down conversion (DC) mode. The memory layout includes six field buffers 910A through 910F and a VBV buffer 912 as well as an area of unallocated memory 914 which may be used to implement the OSD buffer. In DC mode, however, the VBV buffer 912 is allocated at the higher word addresses in the memory. As described above with reference to FIG. 7, although the exemplary embodiment of the invention uses six field buffers, it is contemplated that a larger number of field buffers may be used.

In DC mode, the memory 212 is a 48 Mbit memory and, consequently, there are one-half the number of memory rows as in FS mode. An exemplary memory allocation for a 525P image in DC mode is shown in Table 3.

TABLE 3

|  | 2K page size | 1K page size |
|---|---|---|
| X | 131 | 272 |
| $Y_{PICTMAX}$ | 191 | 95 |
| $Y_{VBV}$ | 192 | 96 |
| $Y_{VBVMAX}$ | 255 | 127 |
| $X_{VBV}$ | 0 | 0 |
| $X_{VBVMAX}$ | 879 | 1759 |

Figure 10:
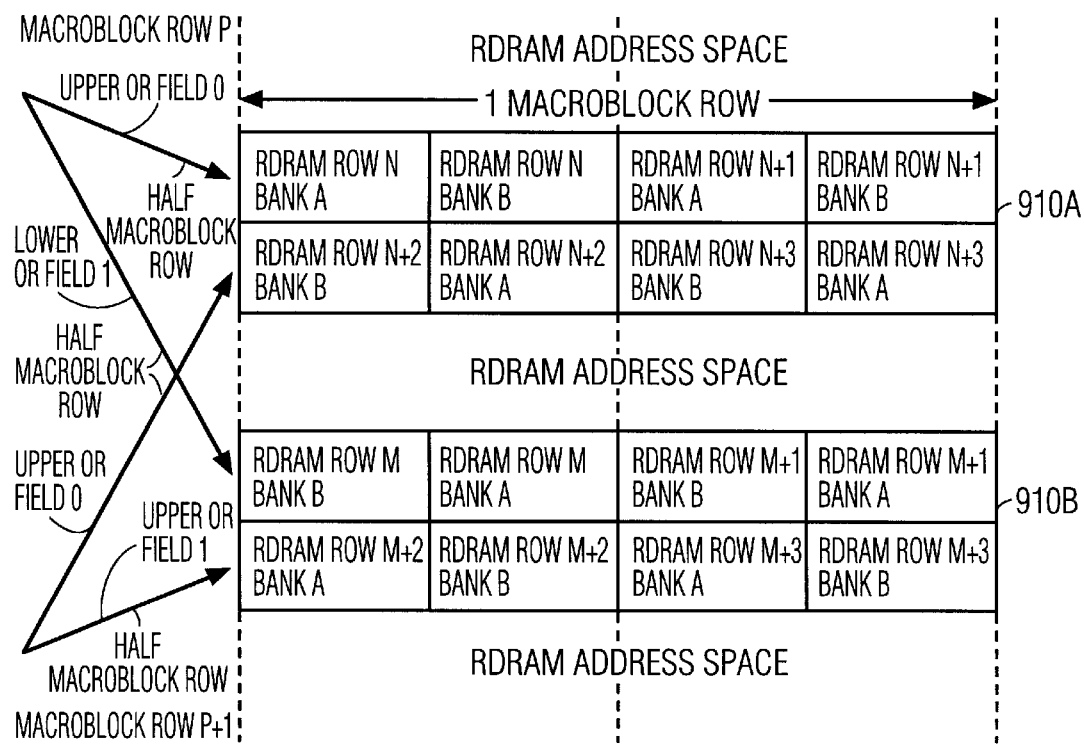
FIG. 10 is a memory address diagram which is useful for describing the process by which decoded macroblocks of image pixels are stored into the memory shown in FIG. 2C.

As shown in FIGS. 7 and 9, images are separated into fields and stored in field buffers. In the exemplary embodiment of the invention, each macroblock is divided into two parts, an upper half-macroblock and a lower half-macroblock. For an interlaced image, the upper half-macroblocks in an image frame are stored in an upper field buffer while the lower half-macroblocks are stored in a lower field buffer. For a progressively scanned image, however, both the upper and lower half-macroblocks are stored in a single field buffer. In either memory configuration, the upper and lower half-macroblocks are stored in respectively different banks of the memory 212. As shown in FIG. 10, for an interlaced image, the first upper half-macroblock is stored in row N, bank A while the corresponding lower half-macroblock is stored in row M, bank B. For a progressive image, the upper half-macroblock is stored in row N, bank A and the lower half-macroblock is stored in row N+2, bank B. Thus, in either case, the accesses to the upper and lower half-macroblocks may be interleaved.

Figure 8:
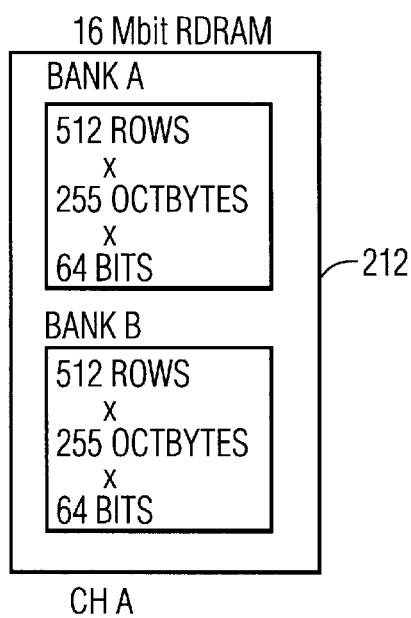
FIG. 8 is a memory structure diagram which illustrates the structure of a single channel of the memory shown in FIG. 2C.

FIG. 8 shows a simplified view of a single channel of the RDRAM memory that is used in DC mode. This memory has only one device per channel. As shown, the channel includes two memory banks, bank A and bank B, each having 512 memory rows, each row having 255 words. Since only a single channel is shown, the word size is 64 bits. With all three channels, the word size is 192 bits.

The memory is organized to allow efficient storage of decoded macroblocks, efficient retrieval of reference macroblocks and efficient display of decoded images. Of these, the retrieval of reference macroblocks is the most difficult. As defined in the ATSC standard, a reference macroblock does not necessarily correspond to a decoded macroblock. Thus, a reference macroblock may include components of as many as four adjacent decoded macroblocks in both luminance and chrominance components. In addition, the adjacent decoded macroblocks may be stored in respectively different memory rows such that data from as many as four memory rows may be accessed to retrieve a single reference half-macroblock. The exemplary embodiment of the invention employs a novel memory mapping scheme to allocate the upper and lower half-macroblocks among the memory rows, memory banks and channels of the RDRAM 212 to minimize the time to fetch a reference half-macroblock.

As described above, the RDRAM 212 includes a cache which holds an entire memory row. Each channel has a separate cache. The present invention stores image data into the RDRAM memory 212 according to a scheme which alternates contiguous blocks among memory rows, banks and channels so that any memory access, whether it be for storing decoded macroblocks, fetching reference macroblocks or fetching lines of image data for display can overlap the data transfer portion of one request with the addressing portion of the next request.

FIG. 10 is a memory map diagram which illustrates the basic memory mapping technique in which half-macroblocks are stored into field buffers such that adjacent half-macroblocks are interleaved between the two banks of the memory devices both vertically and horizontally. As shown in FIG. 10, each of two field buffers 910A and 910B stores one half of an image frame. Upper half-macroblocks for the frame are stored in buffer 910A while the lower half-macroblocks are stored in buffer 910B. As shown in FIG. 10, a half-macroblock row for a 1920 by 1080 image (i.e. a row of half-macroblocks that spans the image in a horizontal direction) occupies four RDRAM rows, each RDRAM row containing 2K bytes (i.e. 2K page size). As described above in table 1, there are 272 half-macroblocks in a field buffer, only two of these half-macroblock rows are shown in each field buffer in FIG. 10.

In FIG. 10, the upper half-macroblocks of macroblock row P, in field buffer 910A, are stored sequentially into bank A of RDRAM row N, then into bank B of RDRAM row N, then into bank A of RDRAM row N+1 and finally into bank B of RDRAM row N+1. The lower half macroblocks of macroblock row P, in field buffer 910B, are sequentially stored in bank B of RDRAM row M, then into bank A of RDRAM row M, then into bank B of RDRAM row M+1 and finally into bank A of RDRAM row M+1. Thus, if the image is progressive, an entire macroblock may be fetched using interleaved read operations to bank A of RDRAM row N and bank B of RDRAM row M.

As is also shown in FIG. 10, the upper half-macroblocks of macroblock P+1 are sequentially stored in bank B of RDRAM row N+2, then into bank A of RDRAM row N+2, then into bank B of RDRAM row N+3 and finally into bank A of RDRAM row N+3. The lower half-macroblocks of macroblock P+1 are sequentially stored in bank A of RDRAM row M+2, then into bank B of RDRAM row M+2, then into bank A of RDRAM row M+3 and finally into bank B of RDRAM row M+3. Thus, for an interlaced image, a reference macroblock which is split across four memory rows may be accessed using four interleaved read operations which alternate between banks A and B of memory rows N, N+2, N+1 and N+3, respectively.

FIG. 10 shows four RDRAM rows per half-macroblock row for a 1920 by 1080 pixel image. Table 4 shows exemplary configurations of the memory 212 for other image sizes for memories which have a 2K page size and a 1K page size, respectively.

TABLE 4

|  | RDRAM rows per half macroblock row | |
|---|---|---|
| Picture Format | 2K page size | 1K page size |
| 1920 × 1080 FS | 4 | 8 |
| 1280 × 720 FS | 4 | 7 |
| 1920 × 1080 DC | 2 | 4 |
| 1280 × 720 DC | 2 | 3 |
| 704 × 480 DC | 2 | 4 |
| 640 × 480 DC | 2 | 4 |

In FS mode, the full image is stored, in DC mode, the image is decimated by a factor of 2 or 3 before it is stored in the memory 212, as described above with reference to FIG. 3B.

In addition to interleaving the individual half macroblocks of a half-macroblock row between the banks of the RDRAM, the component blocks of each half-macroblock are interleaved among the three channels of the RDRAM 212. There are three permutations for the assignment of the two luminance blocks, Ya and Yb and the one chrominance block, UV of each half-macroblock to the three memory channels, A, B and C. This interleaving is shown in FIG. 6B.

As shown, the upper half-macroblock for macroblock U is stored in bank A while the lower half-macroblock is stored in bank B of the RDRAM 212. In both Bank A and bank B, the two luminance blocks, Ya and Yb are stored in channels A and B, respectively. The chrominance block, UV is stored in channel C. For the next consecutive macroblock, V, however, Ya and Yb are stored in channels C and A, respectively while UV is stored in channel B. The third permutation, shown for macroblock W, assigns Ya and Yb to channels B and C and UV to channel A.

The rotation of the permutations continues across memory row boundaries, such as the boundary 660 shown in FIG. 6B. As described above, the memory banks used to store half-macroblocks of a given image field alternate across the macroblock row. This is shown in FIG. 6B as the boundary 660 between the memory rows 662 and 664. As described above, however, images having different resolutions and aspect ratios may use different numbers of half-macroblock locations in a memory row. In the exemplary embodiment of the invention, to ensure that the rotation among memory devices continues across memory row boundaries, the number of half-macroblocks stored into the memory rows of a macroblock row, except for the last memory row, is divisible by three.

Figure 11:
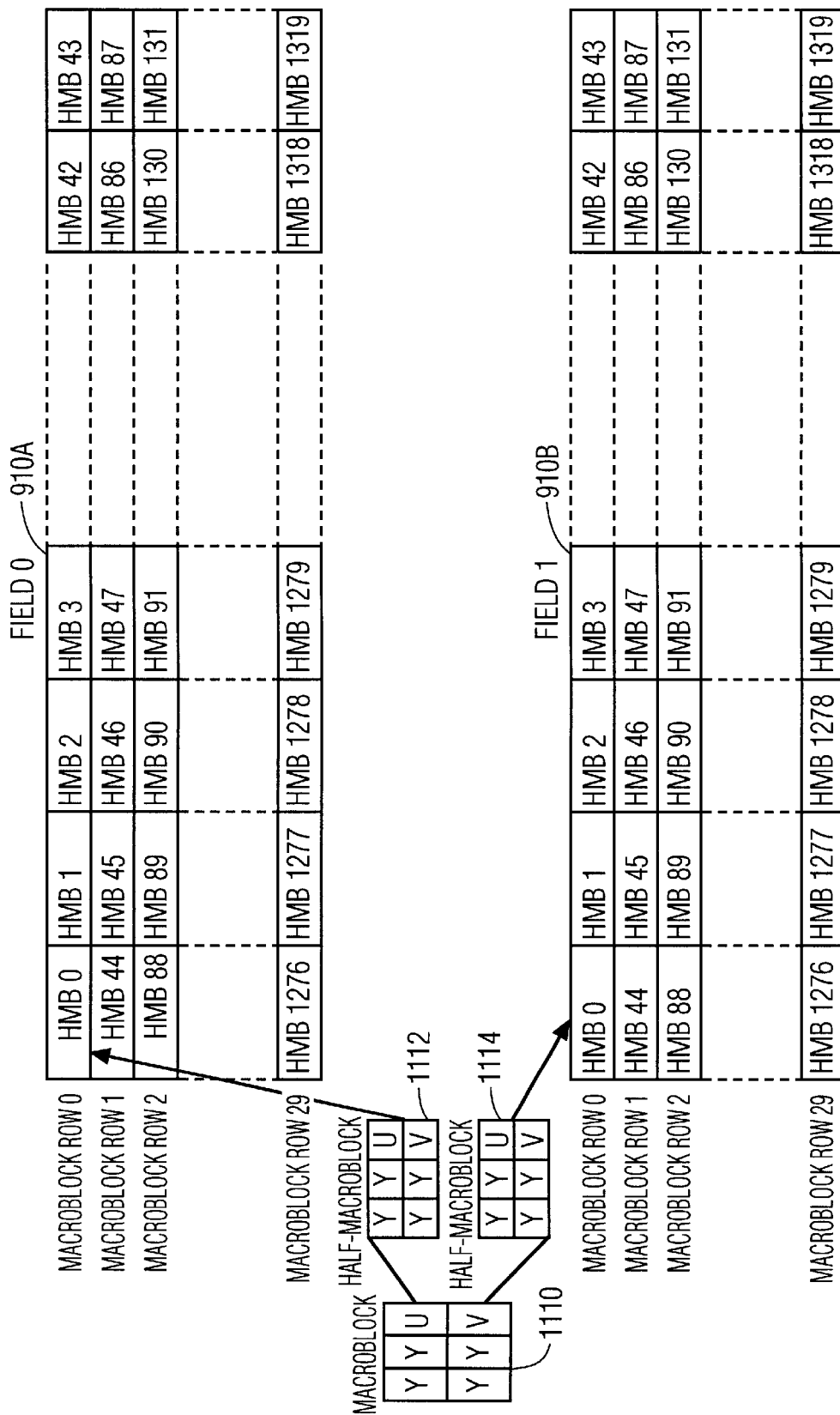
FIG. 11 is a memory layout diagram which is useful for describing the process by which entire image frames are stored into the memory shown in FIG. 2C.

This aspect of the memory layout is shown in FIGS. 11 and 12. FIG. 11 shows a macroblock 1110 containing six 8-pixel by 8-pixel blocks. The luminance (Y) pixels for the upper field become the two luminance blocks for the upper half-macroblock 1112 and the U and V color difference pixels for the upper field become the UV block for the upper half-macroblock 1112. The remaining pixel values in the block 1110 become the two luminance blocks and one chrominance block for the lower half-macroblock 1114.

Figure 12A:
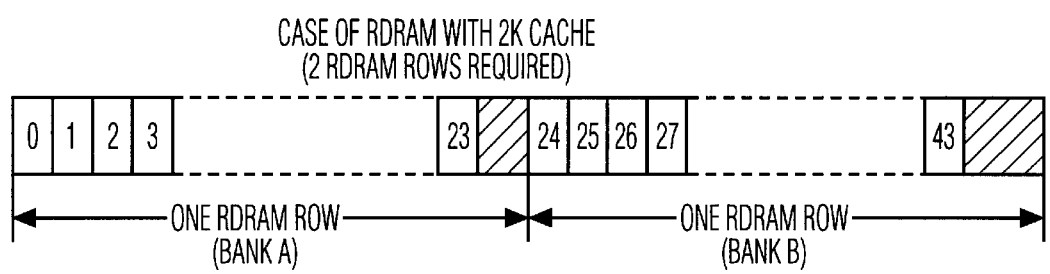
FIGS. 12A and 12B are memory layout diagrams which are useful for describing the mapping of an image frame, as shown in FIG. 11, into the memory rows of the memory shown in FIG. 2C.
Figure 12B:
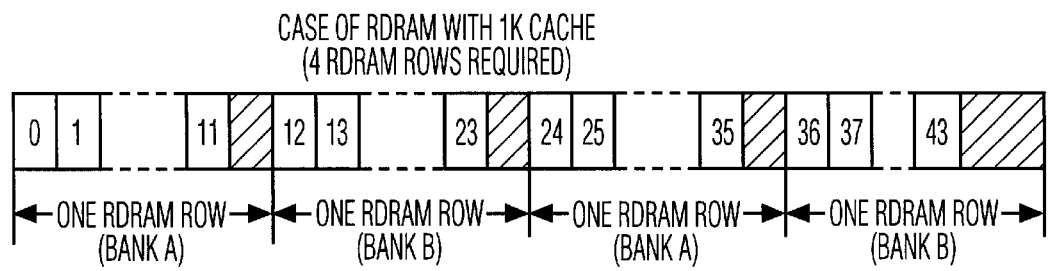

The exemplary image shown in FIGS. 11 and 12 includes 704 by 480 active image pixels. For this image, each macroblock row includes 44 macroblocks. such that the entire image includes 1320 macroblocks. As shown in FIG. 12A, when an RDRAM having a 2k page size is used, two RDRAM rows are used to hold one half-macroblock row such that 24 half-macroblocks are stored in the first RDRAM row and 20 half-macroblocks are stored in the second half-macroblock row. As shown in FIG. 12B, however, when the RDRAM has a 1k page size, the first three memory rows each holds 12 half-macroblocks while the last memory row holds 8 half-macroblocks.

Figure 16:
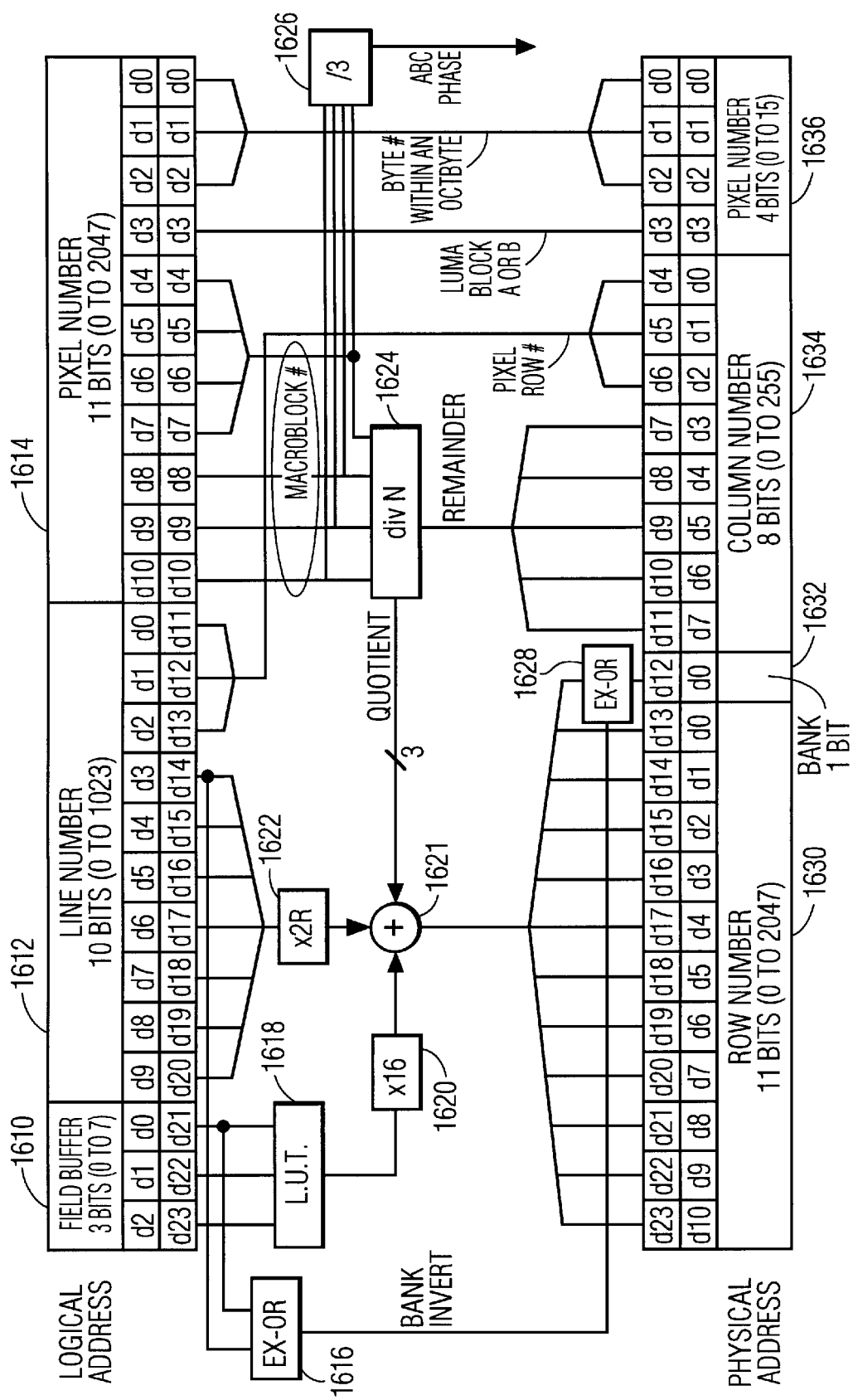
FIGS. 16 and 17 are address mapping diagrams which are useful for describing the operation of the address generators shown in FIG. 2B.
Figure 17:
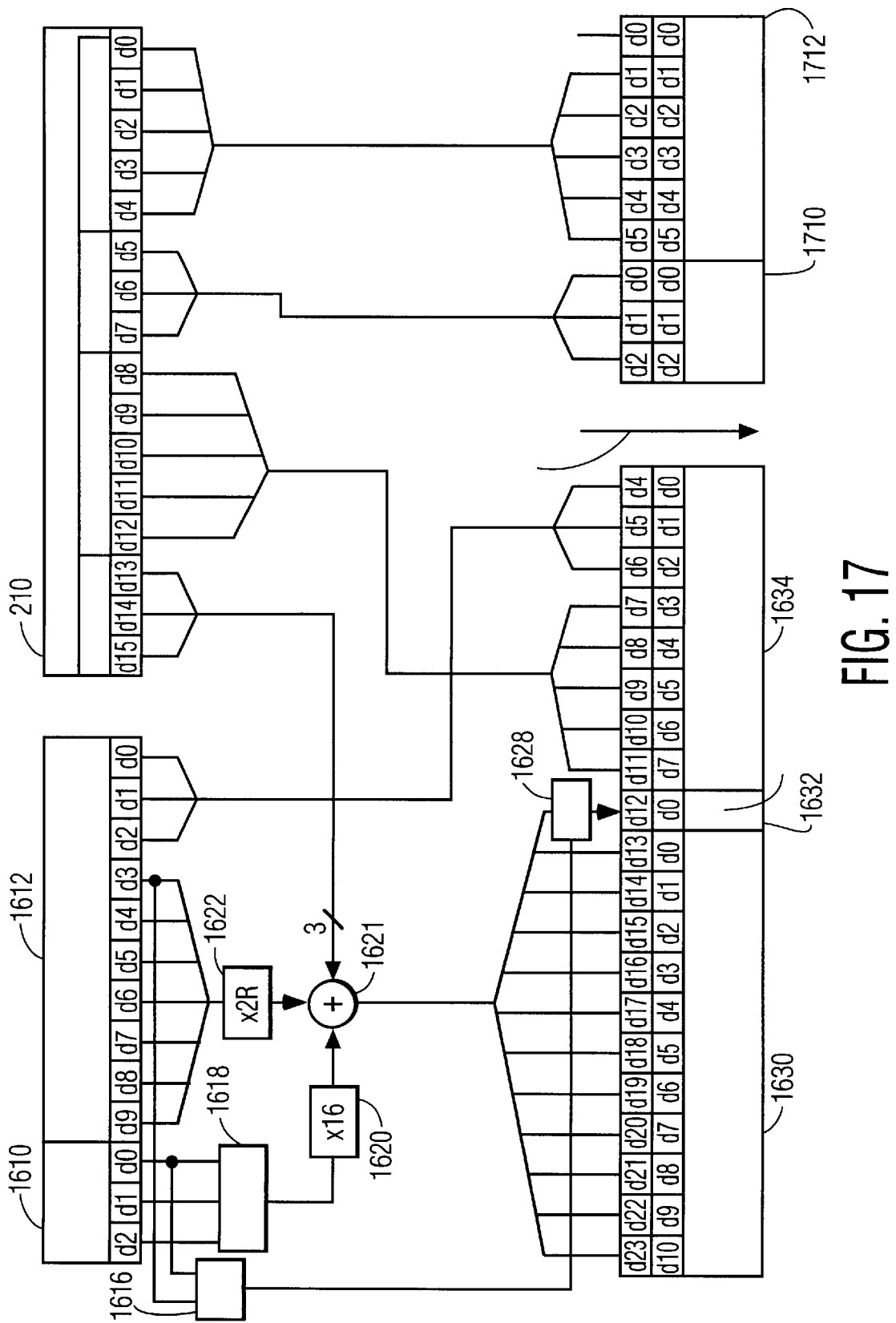
Figure 20A:
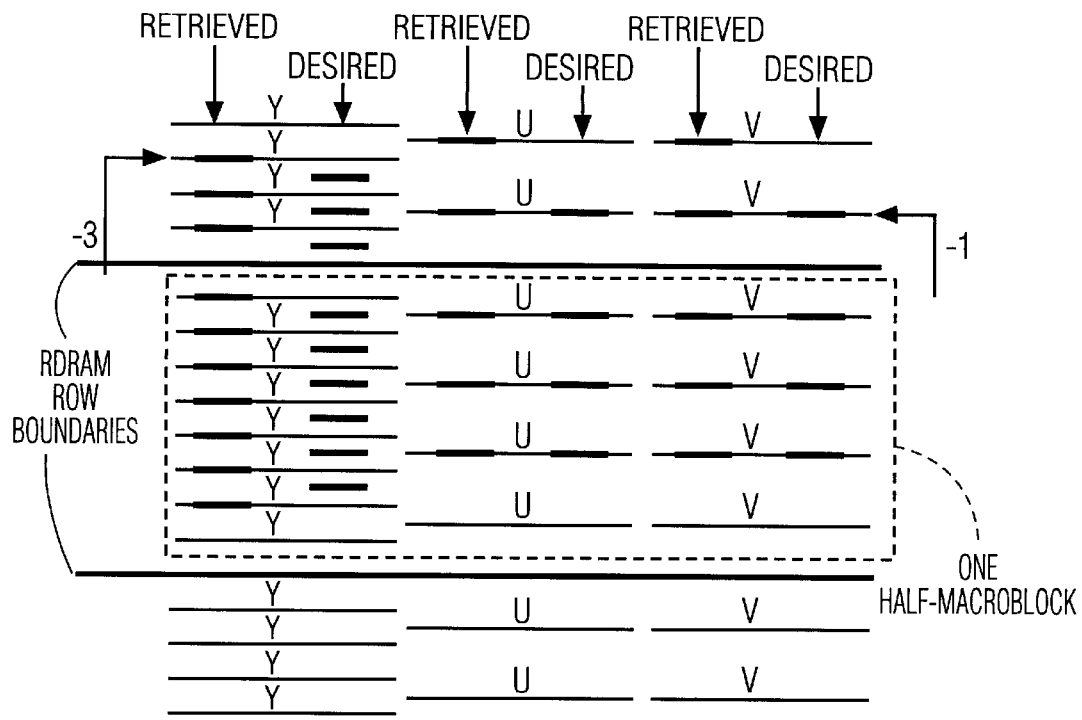
FIGS. 20A and 20F are memory buffer diagrams which are useful for describing the processing of image data fetched from the multi-image memory in order to extract a desired reference half-macroblock for each of the six phases shown in FIGS. 19A and 19B.
Figure 20B:
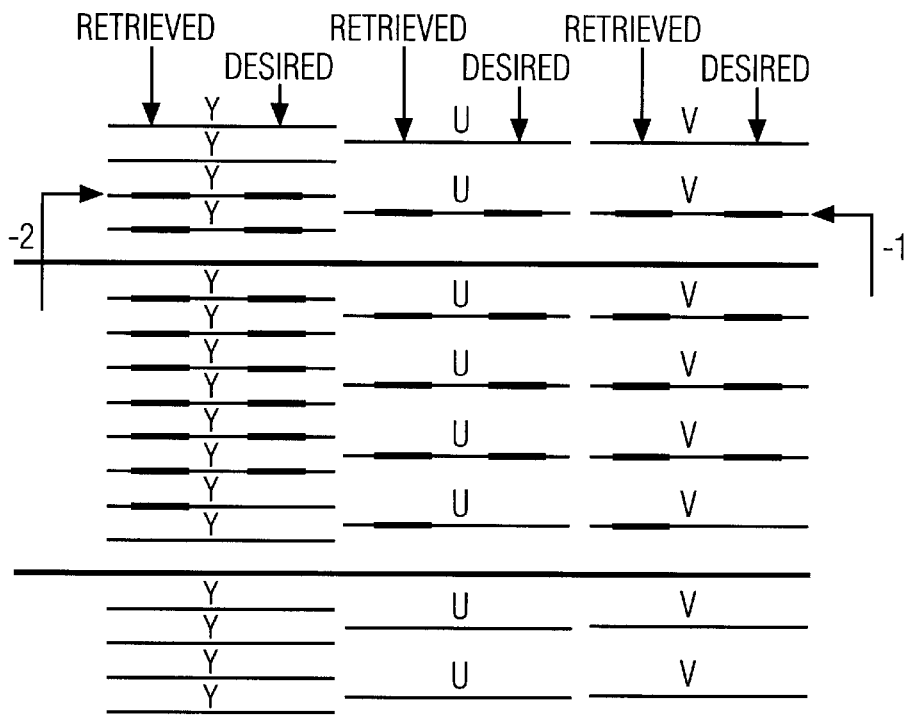
Figure 20C:
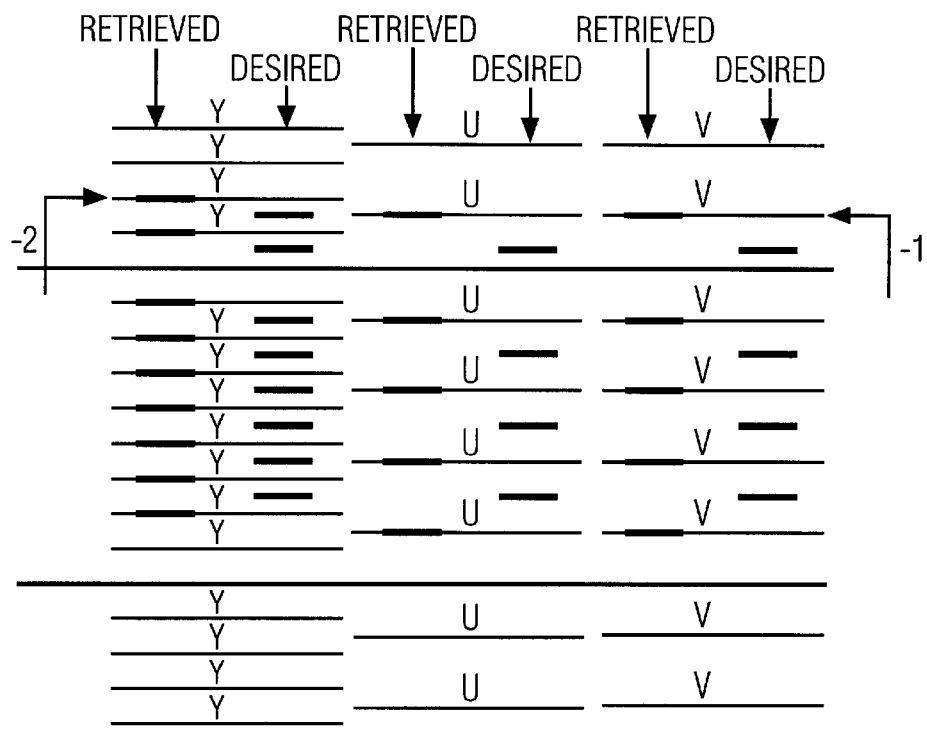
Figure 20D:
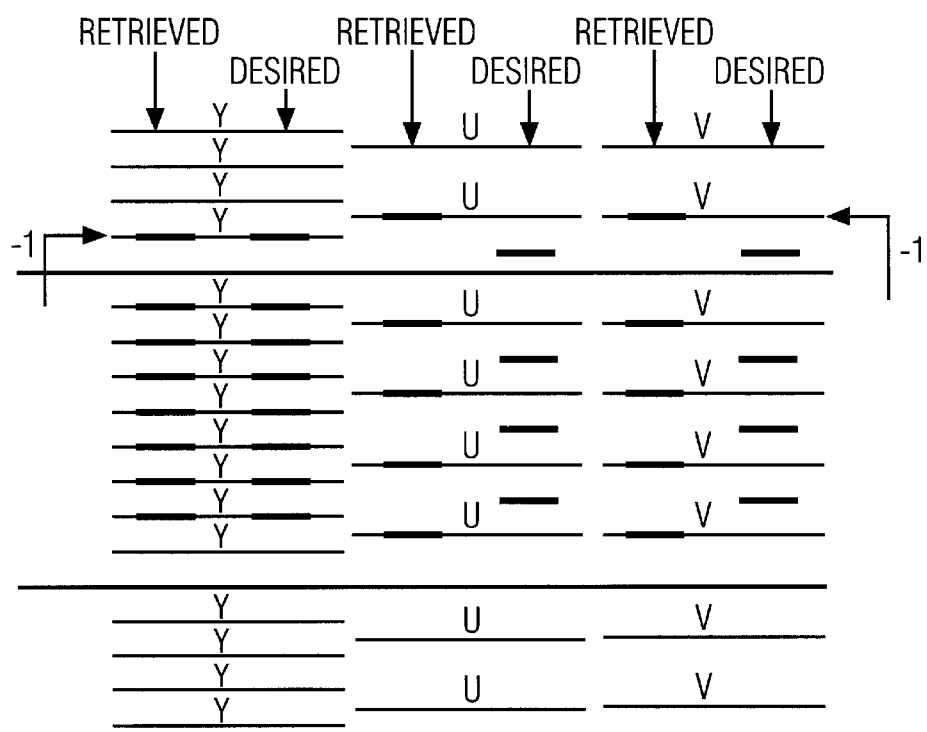
Figure 20E:
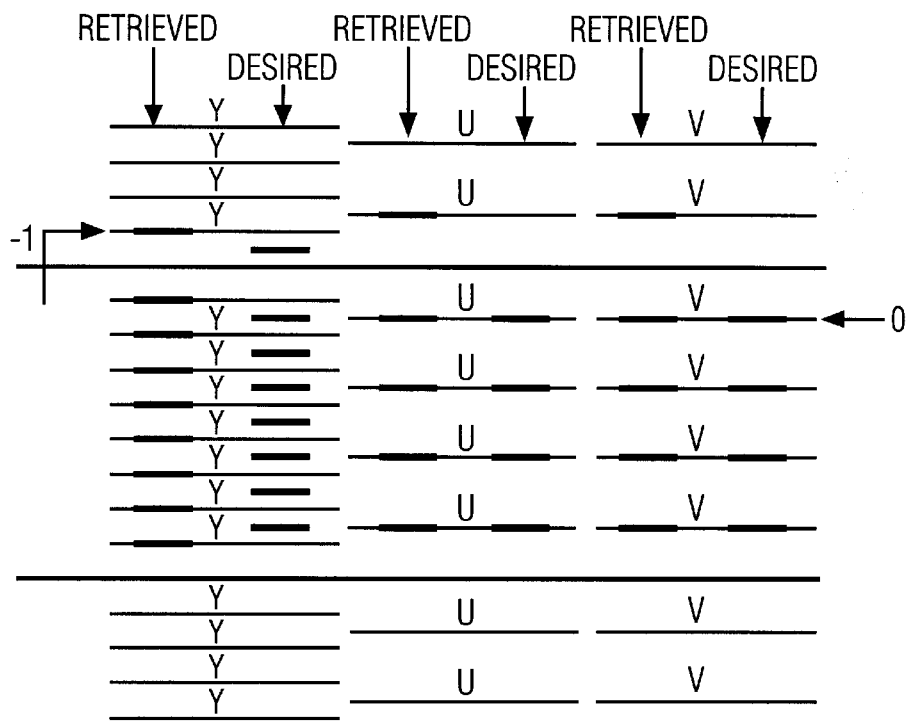
Figure 20F:
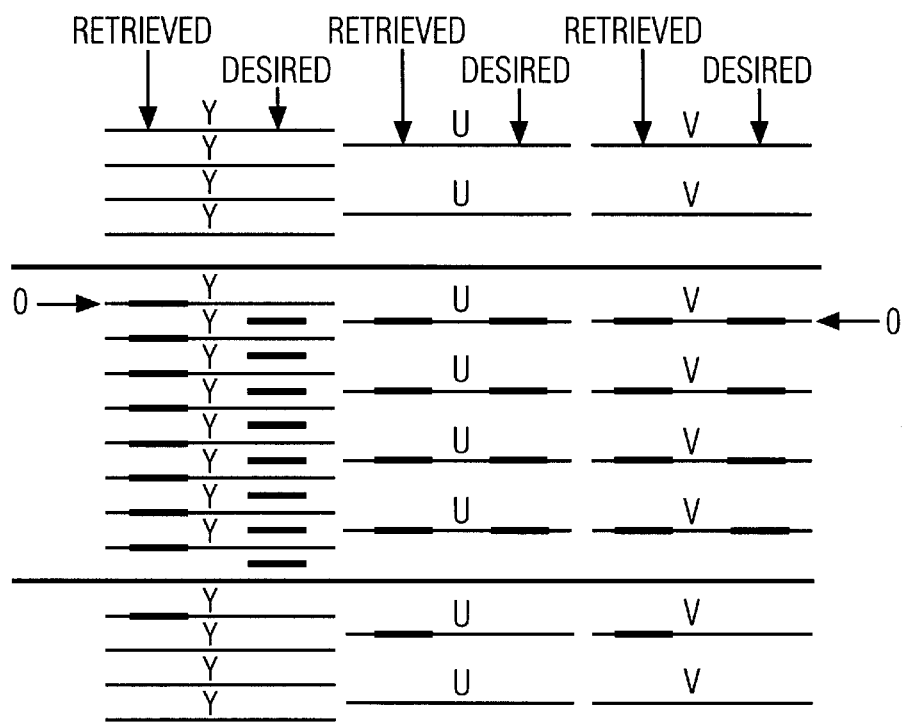
Figure 21A:
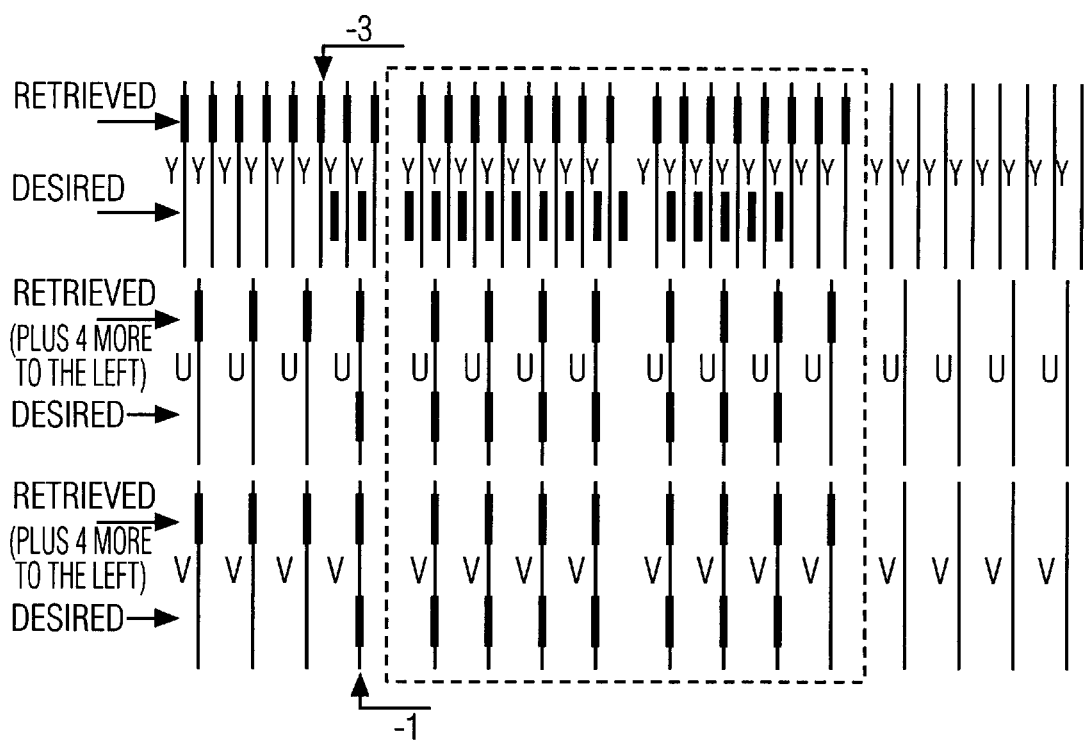
FIGS. 21A and 21F are memory buffer diagrams which are useful for describing the processing of image data fetched from the multi-image memory in order to extract a desired reference half-macroblock for each of the six phases shown in FIGS. 19A and 19B.
Figure 21B:
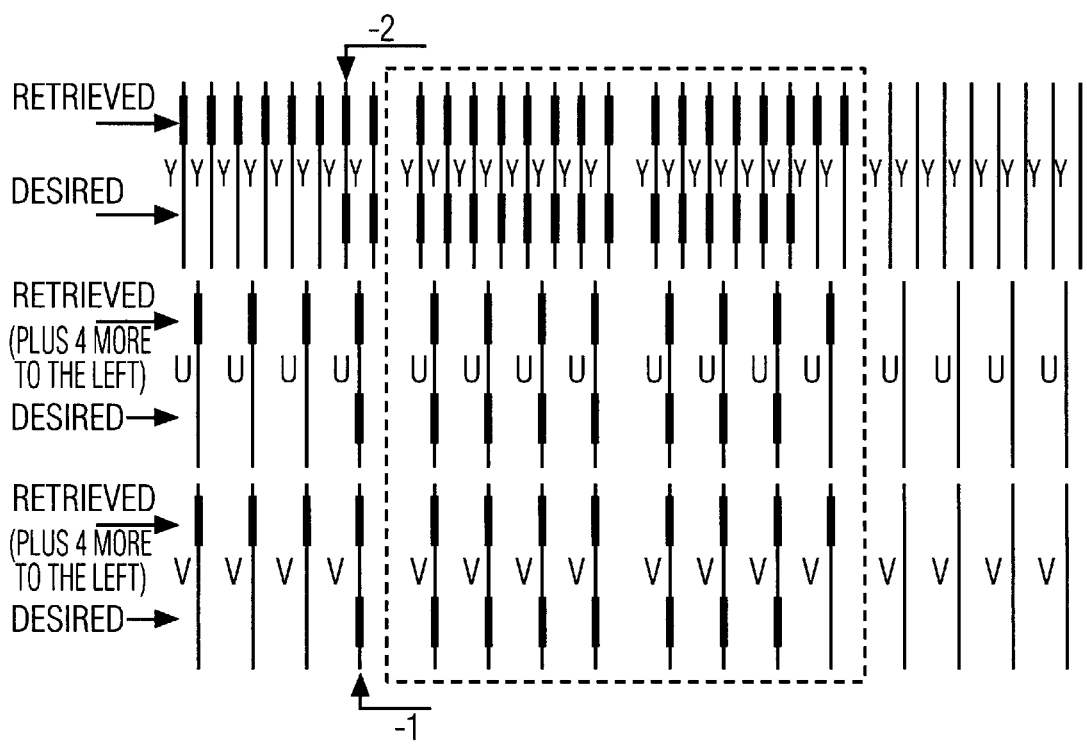
Figure 21C:
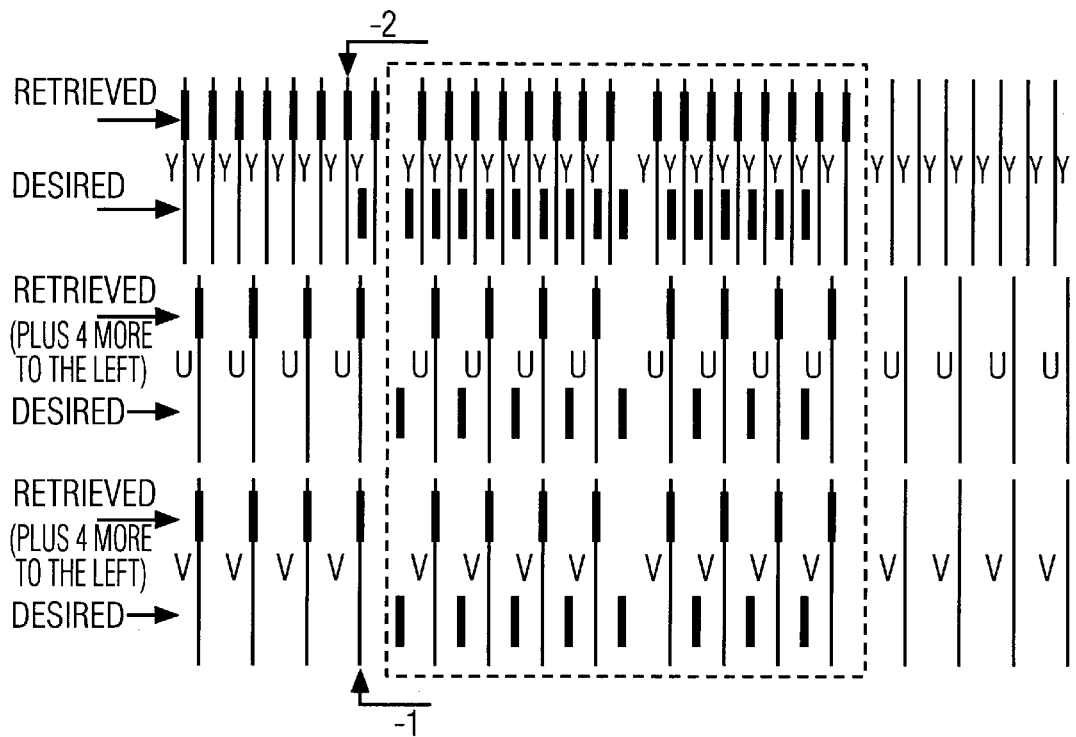
Figure 21D:
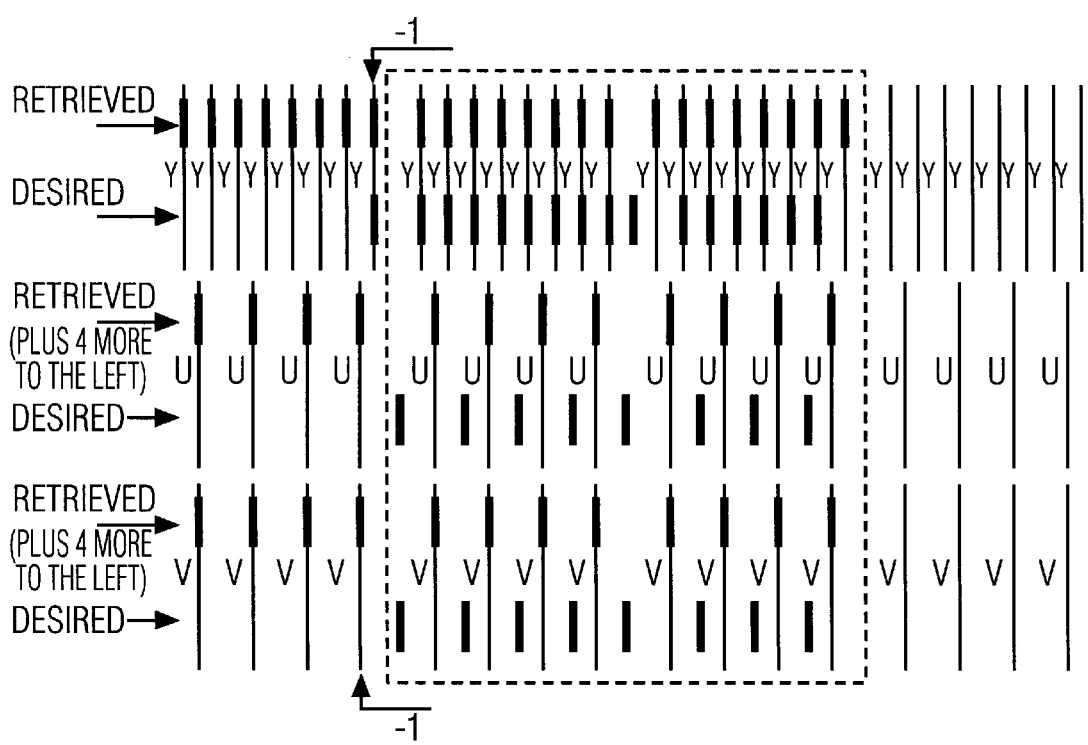
Figure 21E:
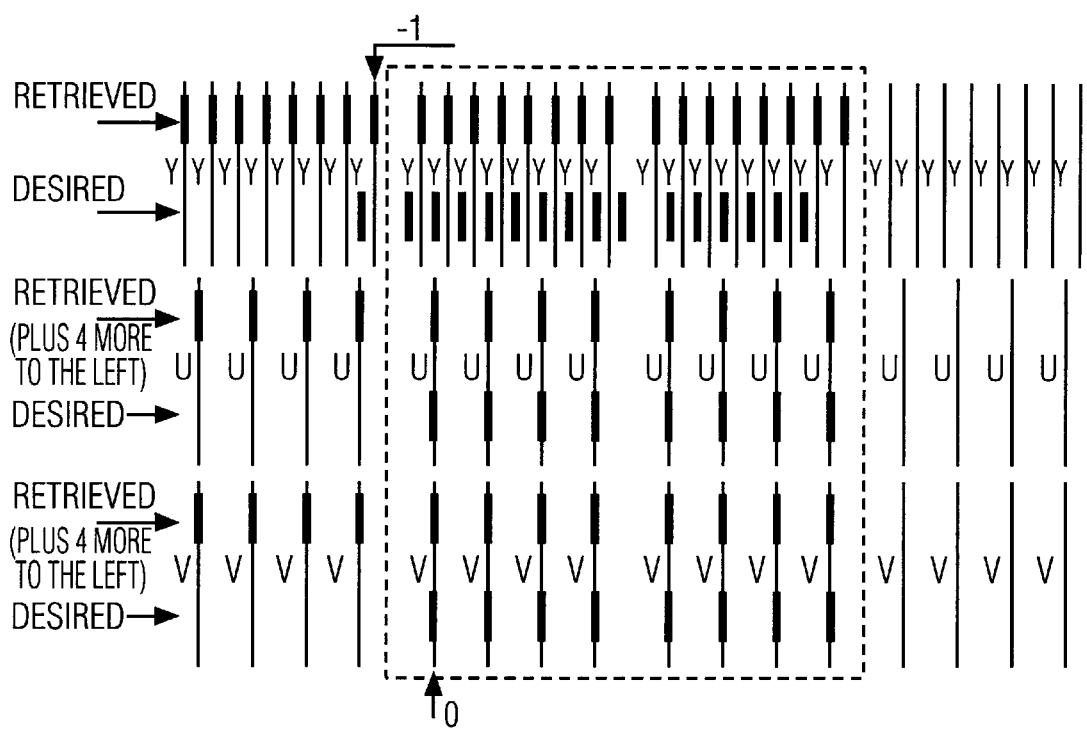
Figure 21F:
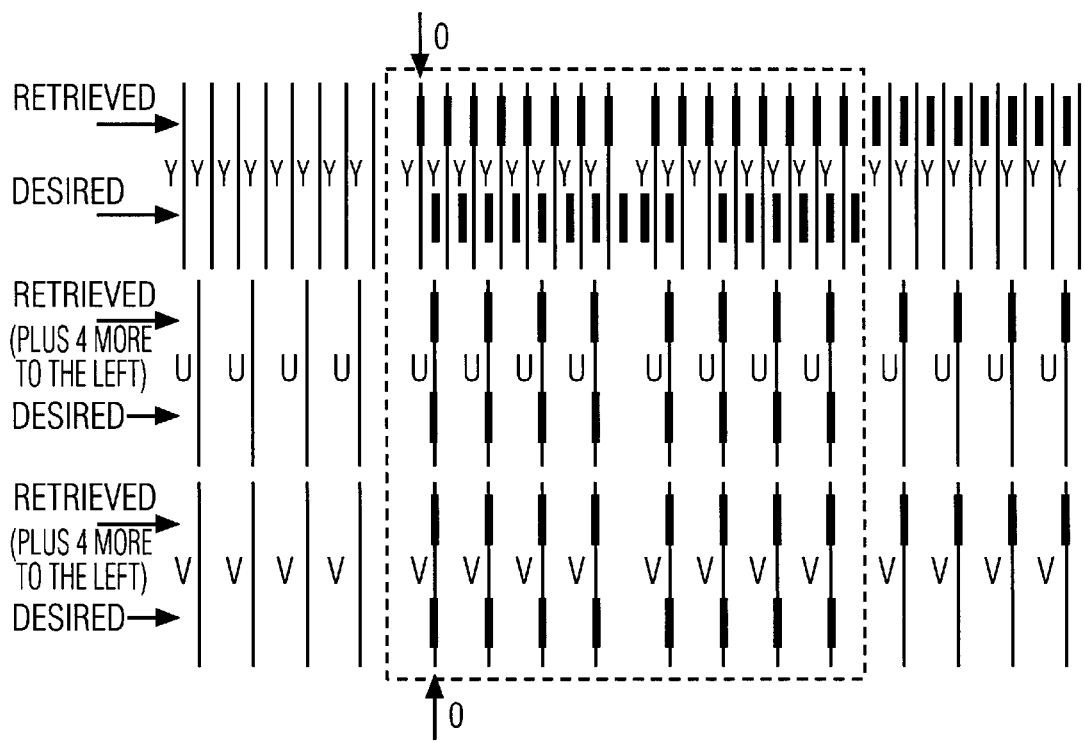

FIGS. 16 and 17 are bit-map diagrams which illustrate the mapping of addresses from image space (logical address) to memory space (physical address). This mapping is used to fetch image data from the memory 212 both for display and to provide reference macroblocks. The mapping shown in FIGS. 16 and 17 implements the memory configuration described above.

FIG. 16 illustrates the general case in which a field buffer number 1610, image line number 1612 within the field and pixel number 1614 within the line are provided to one of the address generators 256A or 256B, shown in FIG. 2B. The low-order bit of the field buffer number and a bit which toggles each eight lines of the image are provided to an exclusive-or gate 1616 which provides a signal indicating that a bank switch should occur. This bit changes state between consecutive field buffers and at each 8 line interval (half macroblock width) in the image to toggle between banks A and B of the memory as described above. The BANK INVERT signal provided by the exclusive-or gate 1616 is applied to an exclusive-or gate 1628 which is coupled to receive the least-significant bit of the memory row number 1630, as calculated by the adder 1621 The output signal provided by the exclusive-or gate is the bank number 1632 of the physical address This bit toggles between the memory banks as consecutive memory rows for a given image are placed in opposite banks.

The field buffer portion 1610 of the logical address value is applied to a look-up-table (LUT) 1618 and 16X multiplier 1620, which may, for example, be implemented as a four-bit shift to more significant bit positions. The LUT 1618 and multiplier 1620 translate the field buffer number into a memory-row offset which indicates the starting memory row for the field buffer having the logical address 1610.

The seven most significant bits (MSBs) of the logical line number are multiplied by a factor of 2R to generate an memory row number within the buffer which includes the line number 1612. The factor R is the number of RDRAM rows per half-macroblock row, set forth in Table 4 above.

In the exemplary embodiment of the invention, the 7 MSBs of the pixel number 1614 are the macroblock number on the image line for that pixel. These seven bits are applied to a divide-by-N circuit 1624, where N is the number of half-macroblocks in each RDRAM row. Exemplary values for N are given in Table 5 below. The divider 1624 produces a three-bit quotient and a 5-bit remainder. The quotient is applied to the adder 1621 and the remainder forms the 5 MSBs of the column number address 1634 within the addressed memory row. The three least significant bits (LSBs) of the line number form the three LSBs of the column number address.

TABLE 5

| Mode | 1K page size | 2K page size |
|------|--------------|--------------|
| FS   | N = 15       | N = 30       |
| DC   | N = 12       | N = 24       |

The four LSBs of the pixel number 1614 form the four LSBs of the pixel number portion 1636 of the physical address.

Figures 19A, 19B:
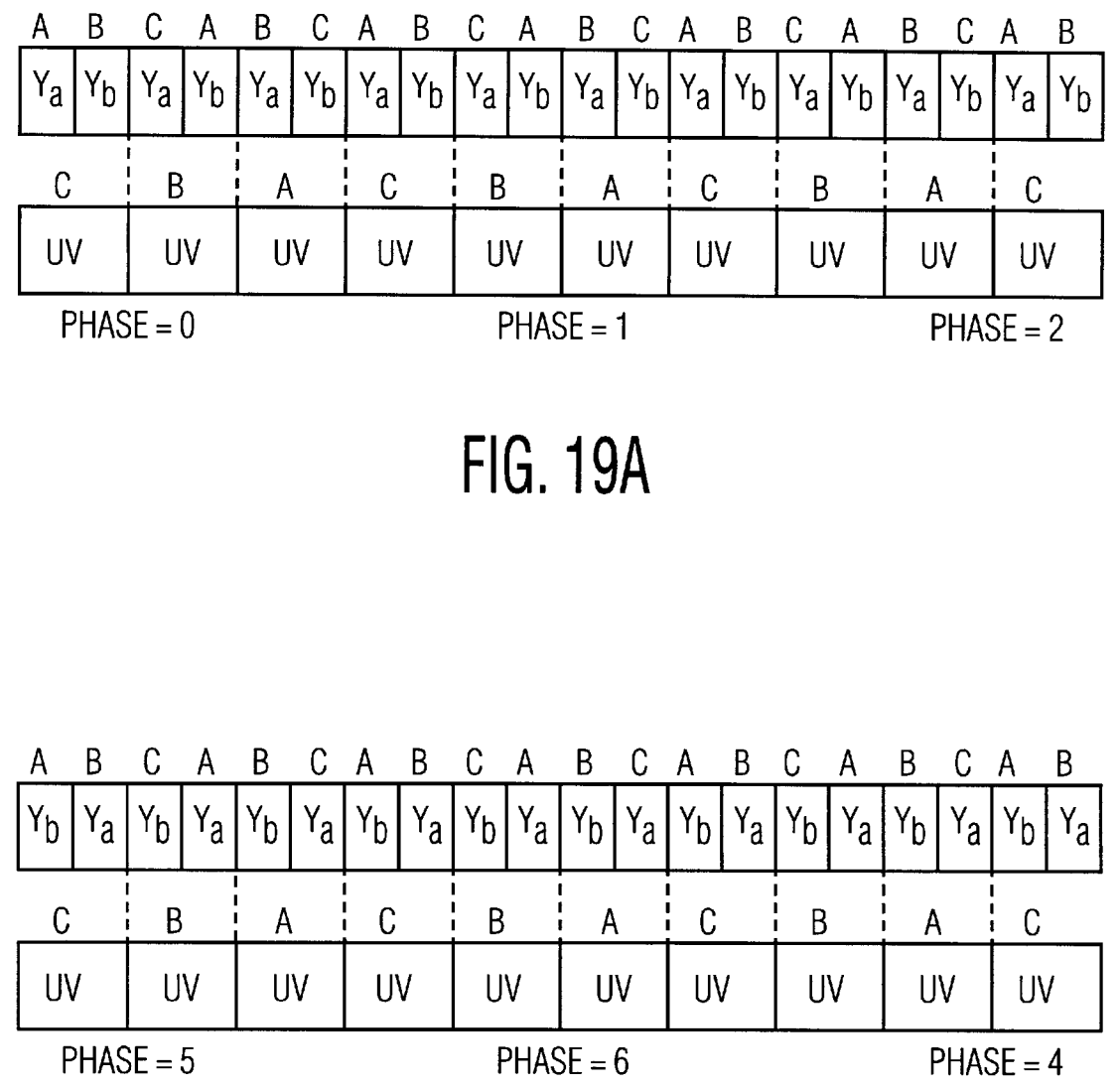

Finally, the macroblock number is also applied to a divide-by-three circuit 1626 which produces a three-bit value that indicates macroblock phase. This phase, as described below with reference to FIGS. 19A and 19B, indicates which permutation of the memory channels is used to hold the two luminance blocks and one chrominance block which constitute the half-macroblock.

FIG. 17 illustrates a special case which may be used to fetch image pixels for display. In FIG. 17, the microprocessor 210, shown in FIG. 3A, assists the address generator by providing address data which remains constant across the image field. The assist provided by the microprocessor 210 eliminates the dividers 1624 and 1626, which increases the operational speed of the addressing circuitry 256A and 256B, shown in FIG. 2. In the circuitry shown in FIG. 17, the microprocessor 210 calculates a row offset and column offset to be used for the picture. In the exemplary embodiment of the invention, the row offset and column offset are fixed for each picture and are provided to the address generator before the picture is displayed. These values may, for example, represent an offset in the image to be used by the pan and scan feature of the ATSC standard to convert an image having an aspect ratio of 16 by 9 for display of a 4 by 3 monitor. In the display processor, once an initial pixel value has been accessed, the system accesses the remaining pixels in display order. Thus, once an initial pixel offset in the image line has been provided, it may be applied to all of the remaining pixels in the line. Because image pixels are fetched for display in groups of 48 pixels, the ABC phase value for display requests may be fixed at a single phase. In the exemplary embodiment of the invention, this phase is phase A as shown by connection 1635 of FIG. 17.

The microprocessor 210 also calculates a group offset and pixel offset for use by the input memory 318. The group offset defines a number of 48 pixel groups between the edge of the image and a group which contains the first pixel that is to be displayed. The pixel offset is the offset within the group of that first pixel. The combination of group offset and pixel offset allow the display to begin with any pixel on the image line.

The row number 1630, column number 1634 and bank number 1632 define the data which is returned from the memory 212 into the display buffers shown in FIGS. 5A, 5B and 5C. This data is interpreted and provided to the display memory responsive to a group offset value 1710 and a pixel offset value 1712 which are provided by the microprocessor 210. Table 6 shows the calculations performed by the microprocessor 210 to convert the pixel number into a pixel offset, group offset, column offset and row offset. Table 7 shows exemplary values of the variable W for FS mode and for interlaced and progressive displays in DC mode. In the equations of table 6, DIV indicates integer division, MOD indicates modulo division, and the value of N for a particular decoder configuration may be determined from Table 5.

TABLE 6 pixel offset = pixel number MOD 48
group offset = (pixel number DIV 48) MOD W
column offset = (((pixel number DIV 48) DIV W)*W*3) MOD N
row offset = (((pixel number DIV 48) DIV W)*W*3) DIV N

TABLE 7

| Mode | |
|---|---|
| FS | W = 6 |
| DC Int. | W = 2 |
| DC Pro. | W = 4 |

The values of pixel offset and group offset are used to access data from the input memory 234 as described below with reference to FIG. 22.

The address generator shown in FIG. 16 is used to fetch reference macroblocks from the memory 212. Reference blocks are accessed for motion compensation processing. Depending on whether an intraframe-coded (I), predictive coded (P) or bidirectionally predictively coded (B) picture is being processed, zero, two or four reference half-macroblocks are used to decode a given macroblock. As described above, with reference to FIG. 1E, the fetched reference half-macroblock is one pixel larger in each direction than a simple half-macroblock so that a half-macroblock having a half-pixel offset may be calculated. Thus, the exemplary embodiment of the invention fetches one 17 by 9 luminance block (Ya and Yb) and two 9 by 5 chrominance blocks (U and V). To simplify this transaction, it is divided into two parts. A larger memory block is first fetched from the memory 212 and stored into the reference memory areas (shown in FIGS. 5A, 5B and 5C) of the input memory buffer 234 (shown in FIG. 2B) and the stored data is then processed to return only the desired 17 by 9 and 9 by 5 blocks of data.

In the exemplary embodiment of the invention, a 24 by 9 luminance augmented half-macroblock and two 16 by 5 chrominance augmented half-macroblocks are fetched into the buffer memory 234. This is illustrated in FIGS. 18A and 18B. In FIG. 18A, the desired augmented half-macroblock of luminance values 1812 is accessed by fetching the larger block 1811 (shown in phantom) and the desired augmented half-macroblocks of chrominance values 1814 are accessed by fetching the larger block 1815 of chrominance values. The example shown in FIGS. 18A and 18B, illustrates the worst case for accessing a reference macroblock in that the target pixel values are split across both bank and memory row boundaries.

Reference image data is provided in response to a current block address and a motion vector. The combination of the current address and motion vector define a starting pixel position for the reference macroblock. The motion compensation processor 314 or 314' (shown in FIGS. 3A and 3B), the microprocessor 210 and the address generators 256A and 256B provide to the read controller 232 (shown in FIG. 2B), the data needed to extract the desired half-macroblock from the fetched data. This information includes: half pixel codes for luminance and chrominance, the down-conversion phase (as described above with reference to FIGS. 14 and 15), the luminance and chrominance pixel offset values, the line offset value and the ABC channel phase. The controller 232 uses this information to extract the desired 17 by 9 luminance block and two 9 by 5 chrominance blocks from the retrieved data and then provides the extracted data to the motion compensation processor 314 or 314'.

Figures 13A, 13B:
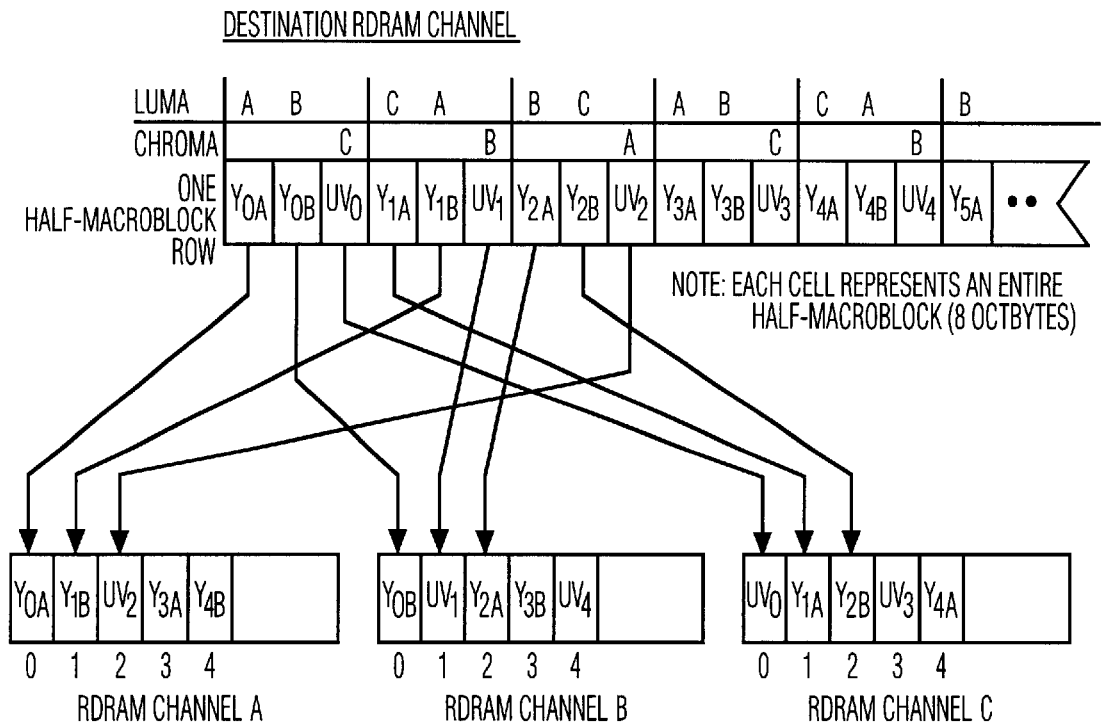
FIG. 13A is a data flow diagram which is useful for describing the allocation of macroblock data among the channels of the memory shown in FIG. 2C.
FIG. 13B is a memory map diagram which shows the image data of FIG. 13A allocated among the different channels.

As described above, although a single address is calculated, data in each of the three channels, A, B and C of the memory 212 may be accessed using different address values. As shown in FIGS. 13A and 13B, the channels used to store data are permuted with successive macroblock store operations. As described above with reference to FIGS. 18A and 18B, however, the addresses used to fetch chrominance data from the memory are different from those used to fetch luminance data. Thus, the address generators 256A and 256B calculate one address and, from the determined ABC phase value, generate appropriate address values for each of the three RDRAM channels. In the exemplary embodiment of the invention, there are six phases. A reference half-macroblock is obtained by accessing three consecutive blocks from an arbitrary starting point. The block may start in channel A, B or C and may begin on block Ya or Yb. Thus, in the exemplary embodiment of the invention, there are six phases. These are numbered 0, 1, 2, 4, 5 and 6. The address for each channel is either the base address (BASE) or the base address plus one (BASE+1). In the exemplary embodiment of the invention, each address generator 256A and 256B generates both addresses and the appropriate address is routed to the appropriate channel as shown in Table 8.

TABLE 8

| PHASE | Channel A | | Channel B | | Channel C | |
|---|---|---|---|---|---|---|
| | Y | UV | Y | UV | Y | UV |
| 0 | BASE | n/a | BASE | BASE + 1 | BASE + 1 | BASE |
| 1 | BASE | BASE + 1 | BASE + 1 | BASE | BASE | n/a |

TABLE 8-continued

| | Channel A | | Channel B | | Channel C | |
|---|---|---|---|---|---|---|
| PHASE | Y | UV | Y | UV | Y | UV |
| 2 | BASE + 1 | BASE | BASE | n/a | BASE | BASE + 1 |
| 4 | BASE + 1 | n/a | BASE | BASE + 1 | BASE + 1 | BASE |
| 5 | BASE | BASE + 1 | BASE + 1 | BASE | BASE + 1 | n/a |
| 6 | BASE + 1 | BASE | BASE + 1 | n/a | BASE | BASE + 1 |

In table 8, only two channels are used to access the chrominance information in each phase. Thus, one channel in each phase is marked n/a indicating that the data fetched from that channel is ignored.

Even after the 192-bit words containing 24 pixels for Y and for UV are fetched and stored into the input memory buffer 234, significant reformatting occurs to provide the motion compensation reference blocks to the motion compensation processor 314 or 314'. First, the correct subset of values from each 192-bit word is selected. Each of Y, U and V pixel data is grouped into a separate 192-bit word. In FS mode, 17 of the 24 pixels are used for the Y reference data and 9 of the 24 pixels are used for each of the U and V reference data words. Because the stored image is horizontally compressed, however, fewer samples are used in down-conversion mode. A three-bit value is provided by the input controller to indicate the starting pixel in the 24 pixels. In addition, the input controller compensates for the ABC phase rotation of the channels of the memory 212 when selecting the desired samples of Y, U and V. A three-bit phase value controls this compensation.

The memory fetch address for both the luminance and chrominance data is derived from a single RDRAM start address which is based on the luminance motion vector. For negative motion vectors, this address fetches a 24 by 5 pixel block which includes the desired chrominance data but the data may be shifted in position relative to the corresponding positive motion vector. A set of six horizontal cases and six vertical cases are defined to obtain the desired chrominance samples from the fetched 25 by 5 pixel block, depending on the state of the half-pixel code and the luminance motion vector. These cases are shown in FIGS. 20A through 20F for horizontal motion vector displacements and in FIGS. 21A through 21F for vertical motion vector displacements. The cases apply to respectively different motion vetor dpsplacments as shown in Table 9.

TABLE 9

| Case | Y Vector | Y Offset | Y Half Pixel | UV Vector | UV Offset | UV Half Pixel |
|---|---|---|---|---|---|---|
| A | -5 | -3 | 1 | -2 | -1 | 0 |
| B | -4 | -2 | 0 | -2 | -1 | 0 |
| C | -3 | -2 | 1 | -1 | -1 | 1 |
| D | -2 | -1 | 0 | -1 | -1 | 1 |
| E | -1 | -1 | 1 | 0 | 0 | 0 |
| B | 0 | 0 | 0 | 0 | 0 | 0 |
| F | 1 | 0 | 1 | 0 | 0 | 0 |
| D | 2 | 1 | 0 | 1 | 0 | 1 |
| C | 3 | 1 | 1 | 1 | 0 | 1 |
| B | 4 | 2 | 0 | 2 | 0 | 0 |

Figure 22:
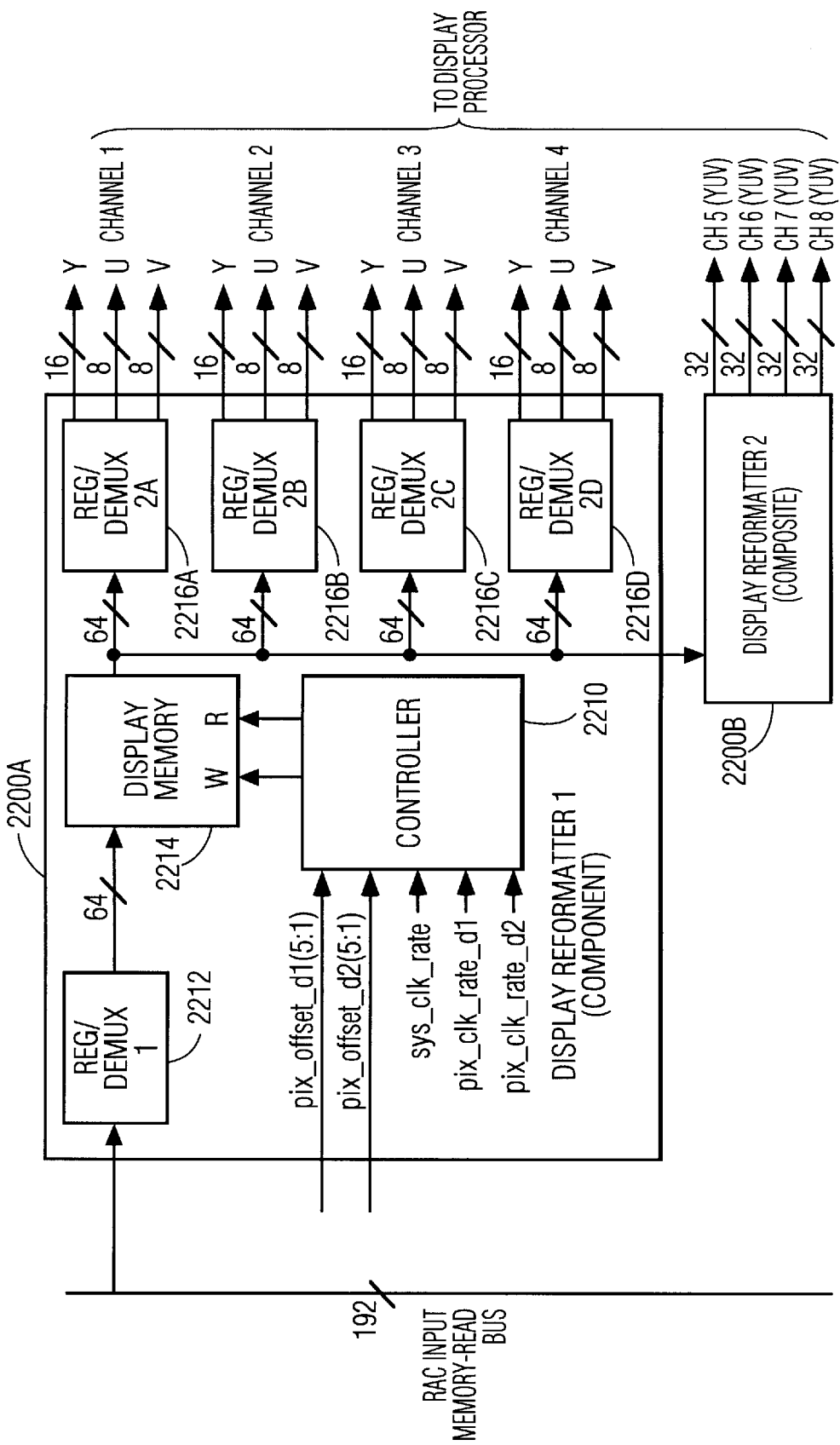
FIG. 22 is a functional block diagram of components of the memory subsystem shown in FIG. 2B which are used to fetch data for display.

FIG. 22 is a functional block diagram which illustrates the processing that occurs to transfer data from the memory 212 to the display conversion processors 372 and 373, shown in FIG. 3B. As shown in FIG. 3B, four lines of samples may be provided to each of the display conversion processors 372 and 373 in DC mode. The display processors 372 and 373 vertically filter the four lines to produce an output signal in which the vertical resolution is reduced to match any reduction in horizontal resolution that may have occurred in the DCT domain filter 362, shown in FIG. 3B. As described above with reference to FIG. 2B and Table 1, in FS mode the input memory provides only one line of samples, in some DC modes it provides eight lines of samples, four to each of the display conversion processors 372 and 373, and in one DC mode, it provides only four lines of samples to the processor 373.

In FIG. 22, there are two display channel interfaces, one, 2200A, supports the component YUV output signals of channel 1 and the other, 2200B, supports composite (e.g. NTSC) output signals. The display processor 322 provides separate starting addresses for each of the two display channels. Separate addresses are provided for luminance and chrominance signals to accommodate a variety of display filtering operations that may be implemented in the display conversion processors 372 and 373 and a variety of image formats. For example, the primary display output port may provide image signals to a progressive display having a 16 by 9 aspect ratio while the secondary display output port provides image signals to an interlaced display having a 4 by 3 aspect ratio. The two address generators, 256A and 256B each provide address values for a respective one of the primary and secondary display conversion processors 372 and 373. The starting addresses indicate a field buffer number and a starting horizontal line on the image. These addresses are applied to the address generators 256A and 256B and to the microprocessor 210. As described above with reference to FIG. 17, the microprocessor 210 calculates and supplies the starting pixel locations which remain constant throughout the display of the picture. the PIX_ OFFSET value indicates which pixel out of a group of 48 is the first to be displayed. This value is provided to the controller 2210 of display channel interface as shown in FIG. 22.

This starting address indicates the starting image line number. Each of the display channel interfaces 2200A and 2200B accesses the addressed line and the next three image lines in the field or frame to provide four lines simultaneously for vertical filtering. In DC mode, because four lines are provided simultaneously by the input memory 318, four lines are loaded into the input memory buffer 234 for each of the active display channel interfaces before any data is provided to the display processors. Once the display channel interfaces begin to operate, they request additional data from the memory 212 as needed and data is provided to the interfaces via the 192-bit read bus. Data from the read bus is stored into a register-demultiplexer 2212 which reformats the data into 64-bit words and transfers the words into the display memory 2214. The controller 2210 determines the sequencing of data from the demultiplexer 2212 to the display memory 2214, and from the display memory 2214 to the register/demultiplexers 2216A, 2216B, 2216C and 2216D as described below with reference to FIG. 23. Although not shown the display reformatter 2200B includes register/demultiplexers which may be identical to the register/demultiplexers 2216A through 2216D.

As shown in FIGS. 5B, when both of the display channel interfaces 2200A and 2200B are active, separate memory buffer areas for the two channels are allocated in the input memory buffer 234. These two memory buffer areas correspond to the display memory 2214 shown in FIG. 22. Data from one buffer area is applied to the register/demultiplexers 2216A through 1116D and data from the other buffer area is applied to the corresponding register/demultiplexers (not shown) in the display reformatter 2200B.

Figure 23:
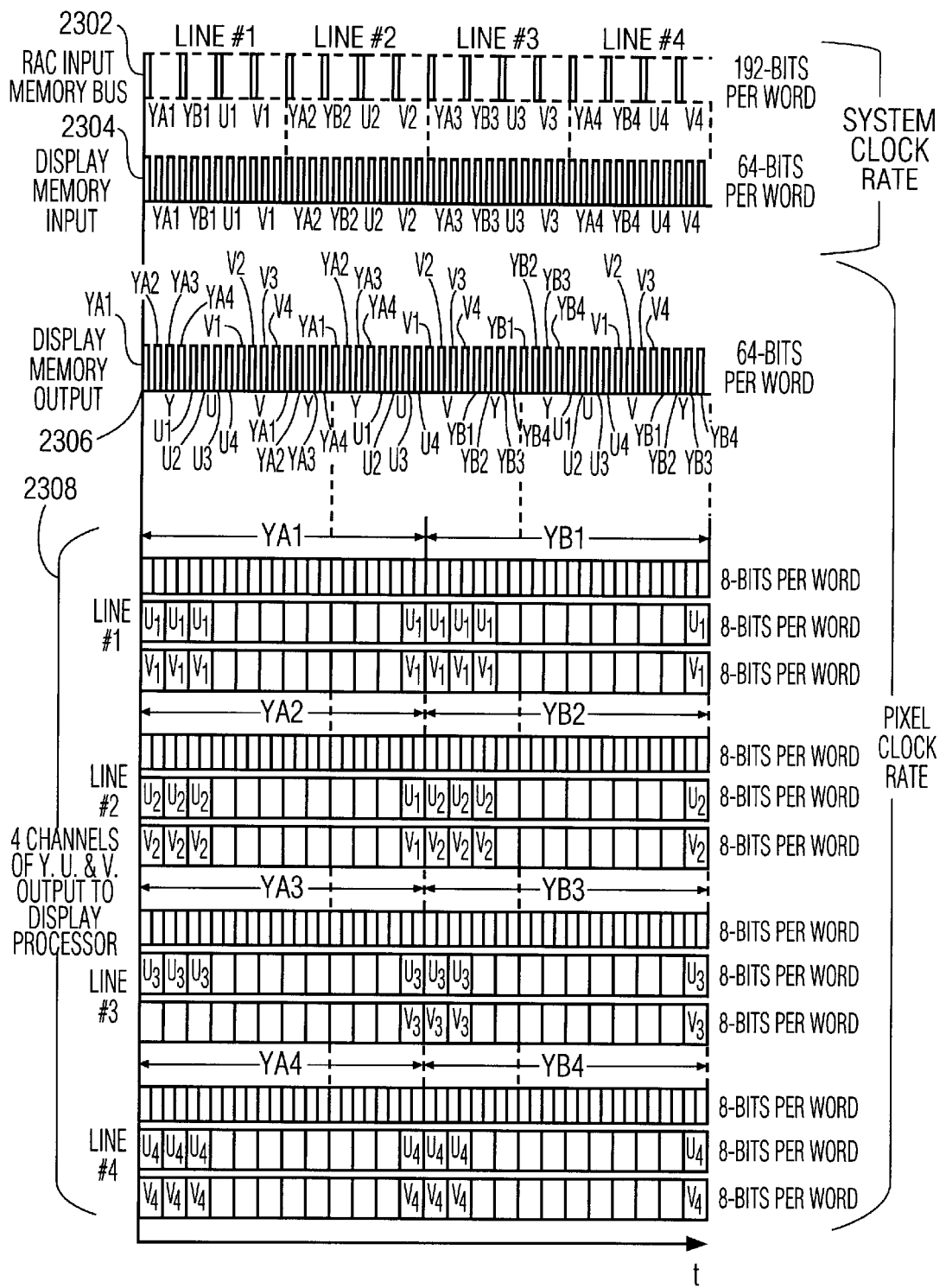
FIG. 23 is a timing diagram which is useful for describing the operation of the circuitry shown in FIG. 22.

FIG. 23 is a timing diagram which illustrates the operation of one of the display conversion processors 2200A or 2200B shown in FIG. 22. As shown at line 2302 in FIG. 23, sixteen 192-bit words are provided by the memory 212 to the input memory register/demultiplexer 2212 in the sequence $Y_{A1}$, $Y_{B1}$, $U_1$, $V_1$, $Y_{A2}$, $Y_{B2}$, $U_2$, $V_2$, $Y_{A3}$, $YB_3$, $U_3$, $V_3$, $Y_{A4}$, $Y_{B4}$, $U_4$, $V_4$, where the numeric subscript indicates the line number of the provided data. Each 192-bit words represents 24 pixels. Thus, the two 192-bit words $Y_{A\ and\ YB}$ represent 48 contiguous luminance pixels and the combination of the U and V values represents 48 contiguous chrominance pixels, since each U and V pixel value is repeated both horizontally and vertically in the reproduced image. As shown at line 2304, the register/demultiplexer 2212 divides each 192-bit words into three 64-bit words and stores the 64-bit words into the display memory 2214. The display memory 2214 and the controller 2210 resequence the 64-bit words to provide them in the sequence $Y_{A1}$, $Y_{A2}$, $Y_{A3}$, $Y_{A4}$, $U_1$, $U_2$, $U_3$, $U_4$, $V_1$, $V_2$, $V_3$, $V_4$, $Y_{A1}$, $Y_{A2}$, $Y_{A3}$, $Y_{A4}$, $Y_{A1}$, $Y_{A2}$, $Y_{A3}$, $Y_{A4}$, $U_1$, $U_2$, $U_3$, $U_4$, $V_1$, $V_2$, $V_3$, $V_4$, $Y_{B1}$, $Y_{B2}$, $Y_{B3}$, $Y_{B4}$, . . . In the exemplary embodiment of the invention, the 64-bit values having the numeric subscripts 1, 2, 3 and 4 are provided to register/demultiplexers 2216A, 2216B, 2216C and 2216D, respectively. The register/demultiplexers 2216A, 2216B, 2216C and 2216D each process the Y, U and V values in parallel to provide the four output lines 2308. As shown in FIG. 23, luminance and chrominance values for all of the four lines are provided in parallel by the display reformatter 2200A.

Figure 24:
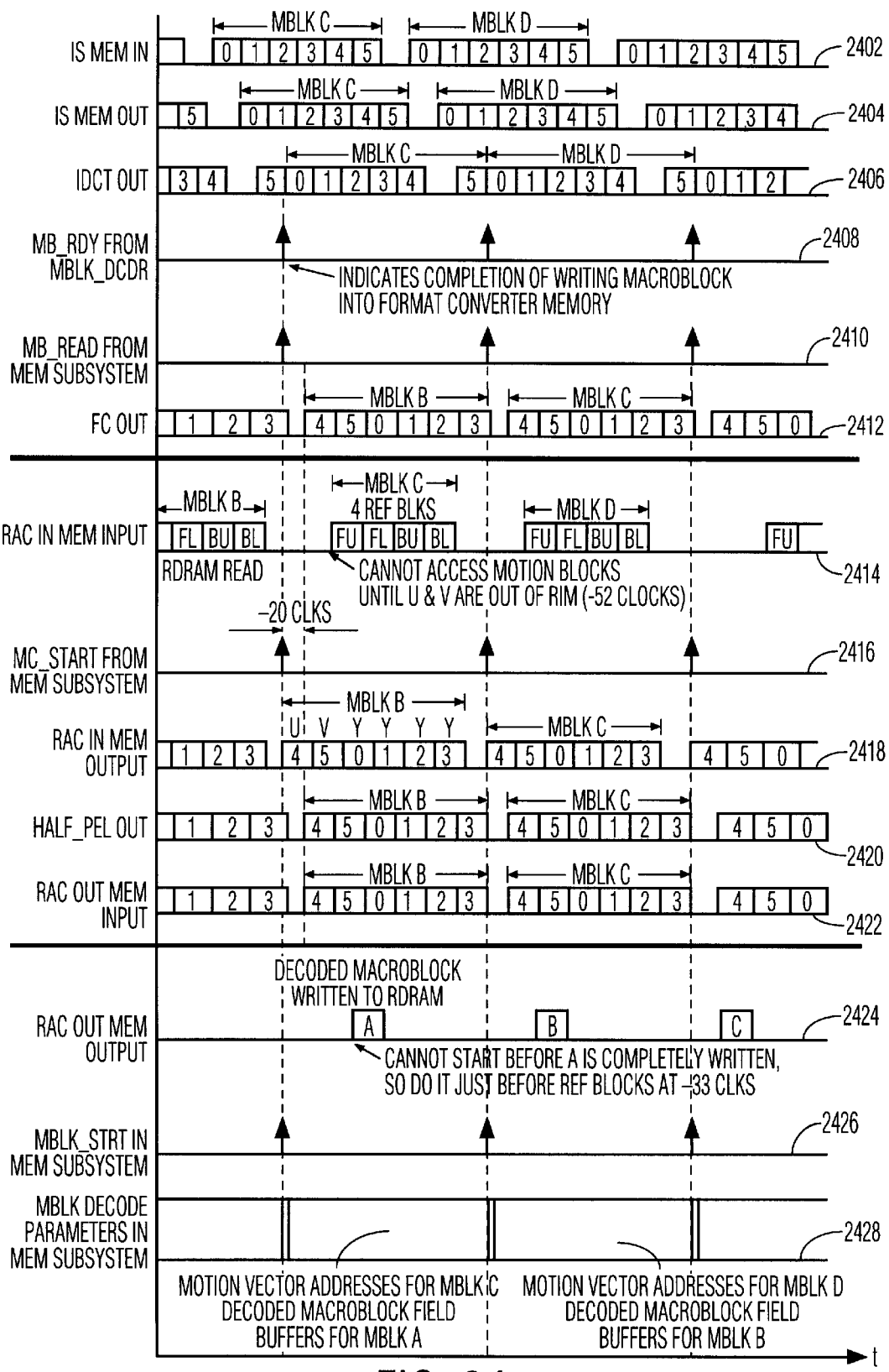
FIG. 24 is a timing diagram which is useful for describing the operation of the memory and memory subsystem in the decoding of an image macroblock.

FIG. 24 is a timing diagram which illustrates the operation of the memory subsystem 214, as shown in FIGS. 2A and 2B during an exemplary decoding sequence. At step 2402, decoded macroblocks C and D are provided by the variable length decoder 310 to an inverse scan memory (not shown), which may, for example, be a part of the inverse quantizer 360. The inverse scan processor reverses the zig-zag scan operation that was used to convert the discrete cosine transform (DCT) of a portion of the image into an 8 by 8 block of DCT coefficients. In step 2404, the macroblocks C and D are provided by the inverse scan memory to the inverse quantizer 360. The macroblocks provided by the inverse quantizer are applied to the DCT filter 362 and then to the IDCT processor 364. At step 2406, a macroblock B (which precedes macroblock C in the image) and macroblock C have been processed by the VLD 310, inverse quantizer 360, DCT domain filter 362 and IDCT processor 364. These decoded macroblocks contain residual pixel values are provided to half-pixel interpolate and motion prediction processor 314'. At the same time, as shown in step 2408, the macroblock decoder provides a macroblock ready signal to the processor 314'. In response to this signal, the processor 314', at step 2410, sends a macroblock read request to the memory subsystem to read the reference macroblocks for the decoded residual pixel values. These reference macroblocks are provided at step 2412.

The reference macroblocks are ready as shown in step 2412 because they have been prefetched in response to motion vectors previously provided to the motion compensation processor 314' by the VLD 310. As shown in step 2414, in response to these requests, the reference macroblocks are fetched from the memory 212 well before they are provided by the format converter at step 2412. At step 2416, the exemplary memory subsystem signals to the motion compensation processor 314' that motion compensation processing may begin. At the same time, step 2418, the reference macroblocks are provided by the input memory 318. Step 2420 shows the reference macroblocks as processed by the half-pixel interpolator in the processor 314' and step 2422 shows the decoded macroblocks B and C, as processed by the summing circuit 366 and down-sampling processor 368 being applied to the output memory 320 of the exemplary memory subsystem. Step 2424 shows the decoded macroblocks, A, B and C being written into the memory 212 from the output memory 320. Finally, steps 2426 and 2428 show the receipt of the motion vectors for macroblocks C and D from the VLD 310 and the processing in the memory subsystem to fetch the reference blocks for macroblocks C and D while storing the decoded macroblocks A and B.

Figure 25:
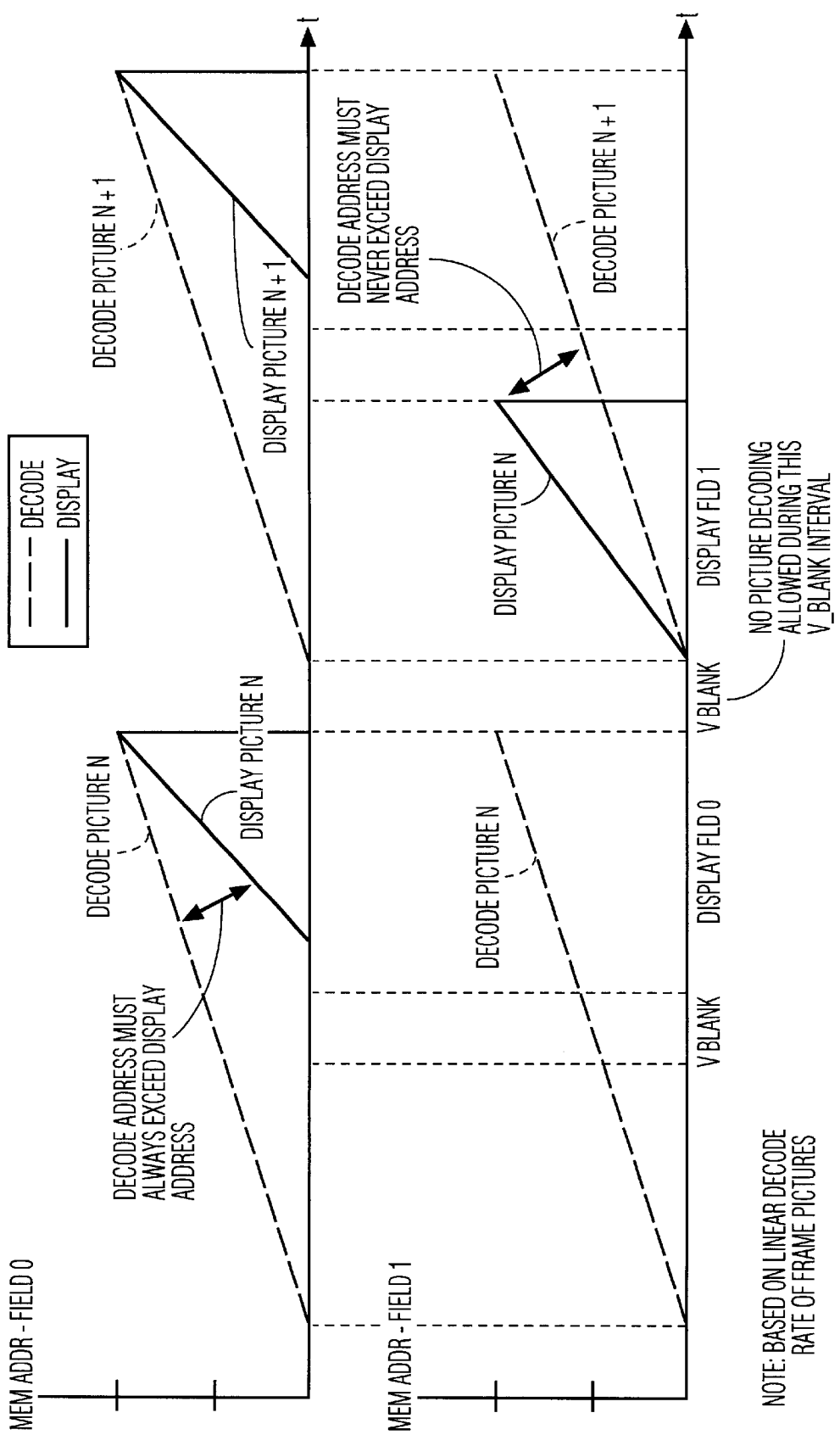
FIG. 25 is a timing diagram which is useful for describing the use of a single frame buffer to decode and display consecutive video images.

FIG. 25 illustrates a timing feature of the exemplary memory subsystem in decoding bidirectional predictively encoded images. As defined in the ATSC specification, pictures can be of type I (intra-encoded), type P (forward predictively encoded) or type B, bidirectionally predictively encoded. Type I and P pictures may be used as anchor images to decode other predictively encoded images. The exemplary memory system, as shown in FIGS. 7 and 9 includes only three frame buffers (six field buffers). Because I and P type pictures are used as reference images to predict P and B type pictures, they are held in the memory after they are decoded. In normal image decoding, two consecutive frames of B pictures may be encountered. In this instance, the decoder displays the first B picture from the same pair of field buffers as are being used to store the second B picture. The handling of consecutive B pictures is problematic when the pictures that are being decoded is in progressive format but the decoded images are being displayed in interlace format.

FIG. 25 is a timing diagram which shows timing constraints for decoding and displaying images these images in field 0 and field 1. During field zero, the decoding operation stores pixels at image positions in advance of those being displayed. During field 1, however, the pixel locations for the decoded image are stored at image positions behind the pixel positions that are being displayed. This implies two constraints on image processing: first, the decoding of a new picture is aligned with the start of field one of the display and second, the decoding operation cannot begin until after the vertical blanking interval. As shown in FIG. 25, if these constraints are observed, a single buffer may be used to both decode and display B-type images.

While the invention has been described in terms of an exemplary embodiment, it is contemplated that it may be practiced as outlined above with modifications within the scope of the appended claims.

What is claimed:

1. A video memory system for storing frames of video image data each frame including first and second interlaced fields, the system comprising:
   a memory device having a cache and first and second banks and addressing logic for each bank such that each of the first and second maemory banks may be concurrently addressed by respective first and second address values to transfer addressed data corresponding to the first address value to the cache during a first interval and to transfer addressed data corresponding to the second address value to the cache during a second interval, immediately following the first interval; and
   an address generator including means for assigning data representing the first field of a frame one of the first and second memory banks and for assigning corresponding data representing the second field of the frame to the other one of the first and second memory banks.

2. A video memory system according to claim 1, wherein the video image data is provided in units of macroblocks, each macroblock including separate luminance and chrominance components and the memory system further includes a further memory device configured such that the first memory device and the second memory device define respectively different memory channels; and the address generator fumrther includes:

means for generating respective address values for the first and second memory devices to cause the memory system to store data representing respective image components of a first macroblock in respectively different ones of the memory devices; and means for changing the memory devices into which the respective image components of a second macroblock are stored relative to the memory devices in which the image components of the first macroblock are stored.

3. A video memory system for storing frames of video image data aving first and second components, the system comprising:

a memory device having first and second partitions, each of the first and second partitions including interleaved data representing the first and second image components;

a first address generator which provides a first address value that addresses the first memory component in the first partition;

a second address generator which provides a second address value, concurrently with the provision of the first address value by the first address generator, the second address value addressing the first memory component in the second partition; and memory access logic for alternately applying the first and second address values to the memory device to fetch the first memory component.

4. A video memory system according to claim 3, wherein:

the video image data is stored in the memory device in units of half-macroblocks, each half macroblock including a luminance component and a chrominance component, and the memory device is partitioned by a plurality of memory rows; and the first address generator generates the first address value for a first one of the plurality of memory rows; and the second address generator generates the second address value for a second one of the plurality of memory rows.

5. A video memory system according to claim 4, further including a controller coupled to the first and second address generators and to the memory access logic, the controller controlling the first and second address generators during a first time interval to address respective first components of the video image data in the first and second partitions during a first time interval and to address respective second components of the video image data in the first and second partitions during a second time interval.

6. A video memory system according to claim 5, wherein:

the memory system includes first and second channels, each channel including a respective portion of the plurality of partitions, wherein the first and second components are intcrleaved among the partitions in each channel such that corresponding ones of the first and second components are stored in corresponding partitions of the first and second channels and the address of the second component in the partition of the second channel is offset by a predetermined value from the address of the first component in the partition of the first channel;

the first and second address generators each generating first and second address values, the second address value from the first address value; and the memory access logic selectively applies the first address value or the second address value generated by the first address generator and the second address value or the first address value generated by the second address generator to access the first and second components of the video data.

7. A video memory system according to claim 3, further including:

a first data interface for providing image data from the memory representing an image for display on a first display device having first display characteristics;

a second data interface for providing image data from the memory representing the image for display on a second display device having second display characteristics, different from the first display characteristics; and a display controller coupled to the first and second address generators for conditioning the first address generator to provide addresses in the memory to address the image for the first data interface and for conditioning the second address generator to concurrently provide addresses in the memory to address the image data for the second data interface.

8. A video memory system according to claim 7, wherein the frames of video image data have first and second numbers of image pixels in respective first and second operating modes, and the video memory system further includes:

a memory buffer having first and second memory buffer areas for receiving the image data for the respective first and second data interfaces; and means for combining the first and second memory buffer areas into a single memory buffer area and for disabling the second data interface when the video memory system is switched from the first mode to the second mode.

9. A video memory system for storing frames of video image data having first and second components, the system comprising:

a memory device having a sufficient number of cells to store a frame of video image data;

an address generator which provides an address value that addresses the video image data in the memory to transfer the video image data at a first data rate;

a buffer memory having first, second and third buffer areas, coupled to the memory to receive the video image data addressed by the address generator; and a display controller coupled to the buffer memory and to the address generator to store display image data into all of the first second and third buffer areas at the first data rate and to fetch the data from the first and second buffer areas at a second data rate greater than the first data rate until all of the data in the first and second buffer areas has been accessed and then to fetch data from alternating ones of the first, second and third data areas at the first data rate.

10. A video memory system comprising:

a random access memory device;

a memory write buffer, coupled to the random address memory device;

a memory read buffer, coupled to the random address memory device;

a memory write controller, coupled to the memory write buffer, the memory write controller having an encoded image data port, a decoded image data port and a microprocessor port, wherein the memory write controller partitions the memory write buffer to form an encoded image data buffer, a decoded image data buffer and a microprocessor buffer;

a memory read controller, coupled to the memory read buffer, the memory read controller having an encoded image data port, a reference image data port, a display image data port and a microprocessor port, wherein the memory read controller partitions the memory read buffer to form an encoded image data buffer, a reference image data buffer, a display image data buffer and a microprocessor buffer;

an overall controller, coupled to receive requests from the memory write controller and the memory read controller, the overall controller including priority means for selectively transferring data between the memory read buffer and the random access memory and between the memory write buffer and the random access memory responsive to a priority value, the priority value corresponding to the partition in the memory read buffer or memory write buffer which is used for the transferred data.

* * * * *